(12) United States Patent
Shiraishi

(10) Patent No.: US 7,009,622 B2
(45) Date of Patent: Mar. 7, 2006

(54) IMAGE PROCESSING APPARATUS, IMAGE PROCESSING METHOD, AND IMAGE PROCESSING PROGRAM

(75) Inventor: Naoto Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/762,476

(22) Filed: Jan. 23, 2004

(65) Prior Publication Data

US 2004/0150656 A1    Aug. 5, 2004

(30) Foreign Application Priority Data

Jan. 27, 2003   (JP)   ............................. 2003-017901

(51) Int. Cl.
*G09G 5/00*       (2006.01)

(52) U.S. Cl. ...................... 345/606; 345/589; 345/596; 345/597; 345/609; 382/167; 382/260; 382/267; 382/300; 358/518; 358/525

(58) Field of Classification Search ................ 345/596, 345/597, 606, 608–610, 622; 382/267
See application file for complete search history.

(56) References Cited

U.S. PATENT DOCUMENTS

| | | | |
|---|---|---|---|
| 5,337,168 A | 8/1994 | Fujii et al. | |
| 5,341,468 A | 8/1994 | Shiraishi et al. | |
| 5,396,585 A | 3/1995 | Fujii et al. | |
| 5,448,690 A | 9/1995 | Shiraishi et al. | |
| 5,455,900 A | 10/1995 | Shiraishi et al. | |
| 5,459,822 A | 10/1995 | Izawa et al. | |
| 5,465,371 A | 11/1995 | Fujii et al. | |
| 5,502,802 A * | 3/1996 | Shiraishi ...................... 345/443 |
| 5,551,019 A | 8/1996 | Izawa et al. | |
| 5,732,204 A | 3/1998 | Fukushima et al. | |
| 5,739,826 A | 4/1998 | Shiraishi et al. | |
| 5,828,378 A | 10/1998 | Shiraishi | |
| 5,859,650 A | 1/1999 | Shiraishi | |
| 5,903,276 A | 5/1999 | Shiraishi | |
| 5,977,984 A * | 11/1999 | Omori ........................ 345/589 |
| 6,008,815 A * | 12/1999 | Levison ..................... 345/428 |
| 6,081,274 A | 6/2000 | Shiraishi | |
| 6,172,678 B1 | 1/2001 | Shiraishi | |
| 6,433,790 B1 * | 8/2002 | Taylor et al. ............... 345/611 |
| 6,473,091 B1 * | 10/2002 | Iida et al. .................... 345/589 |
| 6,809,740 B1 * | 10/2004 | Weed .......................... 345/589 |
| 6,862,111 B1 * | 3/2005 | Lin et al. ..................... 358/1.9 |
| 2003/0053701 A1 | 3/2003 | Shiraishi | |
| 2003/0063813 A1 | 4/2003 | Shiraishi | |

FOREIGN PATENT DOCUMENTS

| JP | 9-190538 | 7/1997 |
|---|---|---|
| JP | 11-15997 | 1/1999 |
| JP | 11-99701 | 4/1999 |
| JP | 2001-101431 | 4/2001 |

* cited by examiner

*Primary Examiner*—Matthew C. Bella
*Assistant Examiner*—Antonio Caschera
(74) *Attorney, Agent, or Firm*—Oblon, Spivak, McClelland, Maier & Neustadt, P.C.

(57) ABSTRACT

An image processing apparatus includes a command analyzing unit obtaining color information of each endpoint of an object by analyzing a drawing command, a draw processing unit obtaining the color information of successive scanned points inside the object through incremental interpolation of the color information, thereby successively producing the color information for an entirety of the object, and an image processing unit processing the color information outputted by the draw processing unit.

24 Claims, 29 Drawing Sheets

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program.

2. Description of the Related Art

In recent years, owing that the functions for color DTP and word processors have been improved, not only text but complicated objects have also become easy to create. The gradation function is one of such functions often used for improving the appearance of documents. One conventional method known for creating drawing data is to create a gradation pattern beforehand, and then masking objects in correspondence with the gradation.

However, with a gradient fill shown in FIG. 30, creating a gradation pattern beforehand may be difficult, in a case where drawing is performed by defining three different colors on each end point of a triangle, and interpolating the inside thereof.

As for another method, in a case where the direction for gradation (halftoning) is horizontal, objects divided into different shades can be overlapped onto each other. This may also be performed for the vertical direction.

Nevertheless, using software, for example, to compensate the inside of the three end points in a manner shown in FIG. 30 requires large amounts of processing.

In order to solve the aforementioned problem, Japanese Patent No. 2897765 discloses a method of drawing a gradation object directly instead of drawing a gradation object through reception of PDL commands, and thus referring to a gradation adjustment table for adjusting the difference between density obtained by computation and gradation during printing.

Further, a CRT display providing high gradient can, in general, express color gradation easily, while a printer providing low gradient, on the other hand, has difficulty in outputting color gradation, especially neutral colors (colors with slight gradation). In order to overcome such difficulty, Japanese Laid-Open Patent Application No. 9-190538 discloses a method where drawing is performed by dividing a gradating portion into plural objects having a width of 2 pixels or more.

Japanese Laid-Open Patent Application No. 2001-101431 discloses a square-shaped gradient fill in which horizontal lines that have same shade are obtained, in a case where shades are different in a vertical direction, by copying a previously drawn line, so as to increase processing speed.

In the field of 3D graphics, RGB colors are distributed to the endpoints of a triangular polygon, and compensated according to a plane equation. Japanese Laid-Open Patent Application No. 11-15997 discloses a mapping process by distributing addresses of a mapping pattern to each end point of a polygon and interpolating the inside of the polygon.

Conventionally, forming a gradation pattern beforehand and masking an object according to the gradation pattern is known as a method for generating drawing data. This method, however, requires large memory space for purposes of, for example, forming large gradation patterns, or performing a masking operation.

Furthermore, it may be difficult to form a gradation pattern beforehand by employing a method of defining different colors to three endpoints of a triangle and interpolating the inside of the triangle (See gradient fill of FIG. 30).

Furthermore, gradation (halftoning) for a single direction (horizontally or vertically) can be performed by dividing gradation into objects having different shades and overlapping the objects on top of each other (e.g. FIG. 31). In this case, however, drawing process is conducted redundantly for many portions; therefore, much memory access is required.

In the aforementioned Japanese Patent No. 2897765, shades are created by performing linear conversion from the left side of an object to the right side of the object and interpolating in a horizontal direction; nevertheless, the manner of how shades are interpolated is not clearly described. Furthermore, in the case where interpolation is performed in accordance with the left and right sides of the object, the value of interpolation may change drastically when there is a change in one of the sides (as the object shown in FIG. 32); this causes a border to be noticeable at the line of the change and deteriorate image quality.

Meanwhile, in a case where a object that is targeted for drawing is rotated, for example, when intensifying the paper employed for printing or when changing the direction of the paper, the aforementioned method may cause gradation of the rotated object to be different compared to that of the object before the rotation, and thereby deteriorate image quality (This is due to the fact that the difference in gradation is not obtained by using a plane equation in accordance with all of the endpoints of the object. Therefore, the aforementioned method may lack precision in forming gradation. Further, the trapezoid employed as an example in the conventional method cannot form a plane and is unable to create gradation suitably unless it is divided into triangles). Furthermore, a gradation adjustment table is required to be provided in the RAM inside the hardware of LSI for increasing processing speed, to thereby increase the size of hardware of the LSI and its cost.

In the aforementioned Japanese Patent Laid-Open Application No. 09-190538 where gradation portion is divided into a plurality of objects in sizes of no less than 2 pixels, calculation may be simple when gradation is either in a horizontal direction or a vertical direction (although it is still necessary to perform much calculation for obtaining the slope of the sides of the respective divided objects); however, employing the aforementioned method in obtaining a gradation, for example, shown in FIG. 30, shall require too much calculation.

The aforementioned Japanese Patent Laid-Open Application No. 2001-101431 is effective only when gradation is in a single horizontal direction, and it cannot be applied to a gradient fill where three endpoints of a triangle (e.g. FIG. 30) are respectively defined with different colors.

SUMMARY OF THE INVENTION

It is a general object of the present invention to provide an image processing apparatus, an image processing method, and an image processing program, that substantially obviate one or more of the problems caused by the limitations and disadvantages(of the related art.

More specifically, it is an object of the present invention to provide an image processing apparatus, an image processing method, and an image processing program to require no large memory space such as space for expanding a large gradation pattern or space for conducting a masking process to drawing data.

It is also an object of the present invention to provide an image processing apparatus, an image processing method, and an image processing program that suitably output neutral colors (colors with slight gradation) even with a low gradient printer by employing a color information interpolating unit which controls changes in color by obtaining changes of resolution (mesh) with reference to prescribed smallest (minimum) color lengths in a vertical and horizontal direction of a square surrounding an object (Thereby, while the sides of the object is computed with an ordinary resolution, resolution can be changed for the object having its inside filled).

It is also an object of the present invention to provide an image processing apparatus, an image processing method, and an image processing program that increase processing speed of a (gradient fill) drawing process by operating a setup unit, a start point computation unit, a horizontal color information interpolating unit, a color conversion unit, and a halftone unit, in parallel.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image processing apparatus, an image processing method, and an image processing program particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image processing apparatus including: a command analyzing unit obtaining color information of each endpoint of an object by analyzing a drawing command; a draw processing unit obtaining the color information of successive scanned points inside the object through incremental interpolation of the color information, thereby successively producing the color information for an entirety of the object; and an image processing unit processing the color information outputted by the draw processing unit, wherein the draw processing unit further includes a color information interpolating unit controlling change of color by interpolating color in horizontal and vertical directions in accordance with a mesh, which is shaped as a square surrounding the object and is divided into minimal color lengths in vertical and horizontal directions.

The present invention also provides an image processing method comprising the steps of: a) obtaining color information of each endpoint of an object by analyzing a drawing command; b) obtaining the color information of successive scanned points inside the object through incremental interpolation of the color information, thereby successively producing the color information for an entirety of the object; and c) processing the color information outputted in step b), wherein step b) further includes a step of: controlling change of color by interpolating color in horizontal and vertical directions in accordance with a mesh, which is shaped as a square surrounding the object and is divided into minimal color lengths in vertical and horizontal directions.

The present invention also provides an image processing program including the functions of: a) obtaining color information of each endpoint of an object by analyzing a drawing command; b) obtaining the color information of successive scanned points inside the object through incremental interpolation of the color information, thereby successively producing the color information for an entirety of the object; and c) processing the color information outputted in function b), wherein function b) further includes a function of: controlling change of color by interpolating color in horizontal and vertical directions in accordance with a mesh, which is shaped as a square surrounding the object and is divided into minimal color lengths in vertical and horizontal directions.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

[Structure of Image Forming Apparatus]

Figure 1:
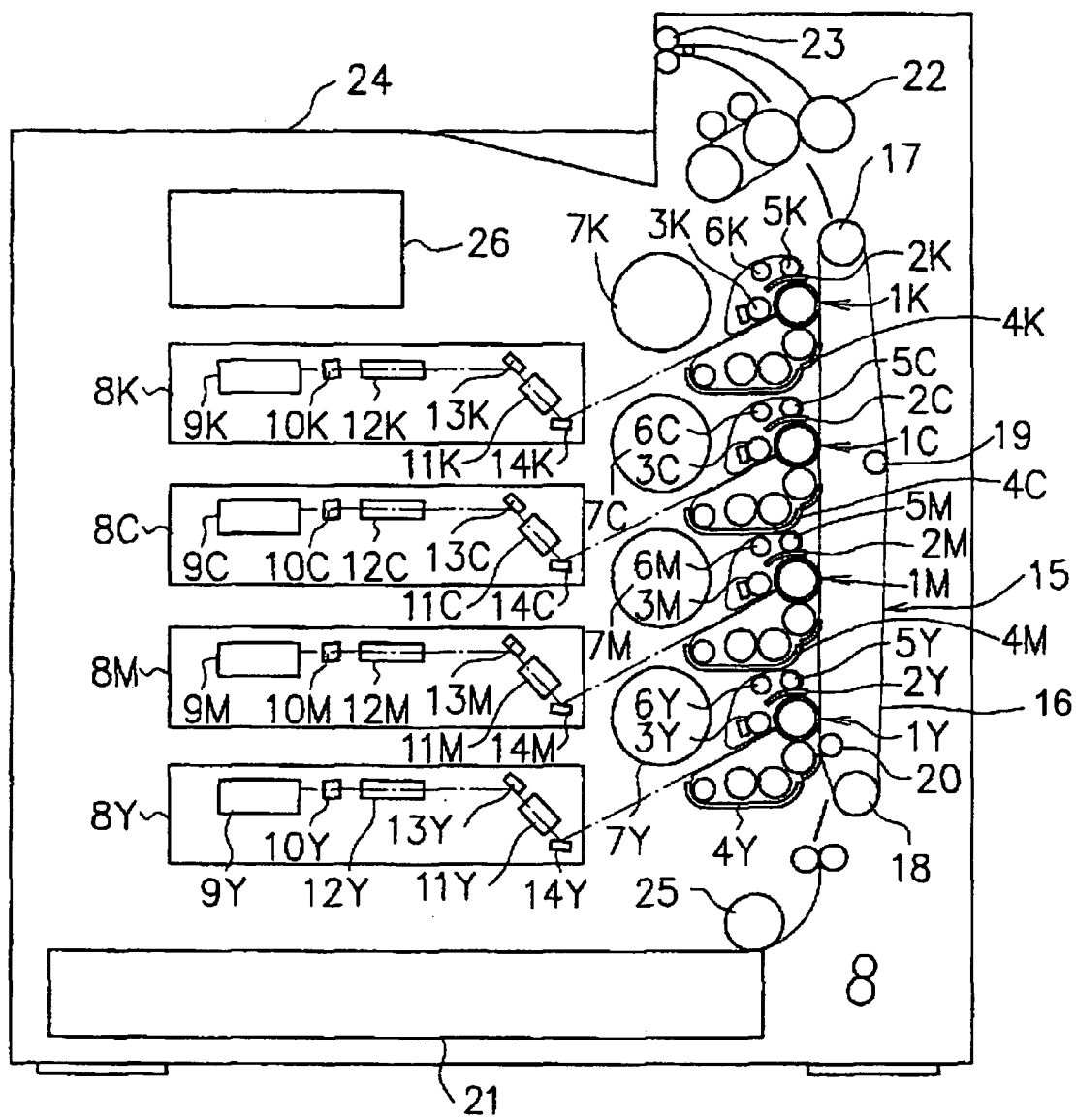
FIG. 1 is a diagram for describing a mechanism of an image forming apparatus according to an embodiment of the present invention.

FIG. 1 is a diagram showing a structure of an image forming apparatus according to an embodiment of the present invention. The image forming apparatus is a color printer of a four drum tandem type which forms images in four colors (Y, M, C, K) with separate image forming units 1Y, 1M, 1C, 1K, and combines the four color images.

Each of the image forming units 1Y, 1M, 1C, and 1K has, for example, OPC (Organic Photoconductor) drums 2Y, 2M, 2C, 2K with a small diameter (functioning as image bearing members); charge rollers 3Y, 3M, 3C, 3K (functioning as charging units) disposed at an upstream side surrounding the OPC drums 2Y, 2M, 2C, 2K; development units 4Y, 4M, 4C, 4K forming toner images for each of the colors Y, M, C, K by developing each of the electrostatic latent images on the OPC drums 2Y, 2M, 2C, 2K with a developer; cleaning units 5Y, 5M, 5C, 5K; and discharge units 6Y, 6M, 6C, 6K.

Toner bottles 7Y, 7M, 7C, 7K supplying Y toner, M toner, C toner, and K toner to each of the developing units 4Y, 4M, 4C, and 4K are disposed at the side of each of the developing units 4Y, 4M, 4C, and 4K. Further, each of the image forming units 1Y, 1M, 1C, 1K includes independent optic writing units 8Y, 8M, 8C, and 8K. The optic writing units 8Y, 8M, 8C, and 8K including, optic components, for example, a laser diode (LD) light source 9Y, 9M, 9C, 9K (serving as a light source), collimator lens 10Y, 10M, 10C, 10K, and fθ lens 11Y, 11M, 11C, 11K, and a deflection scan unit such as polygon mirrors 12Y, 12M, 12C, 12K, or reflection mirrors 13Y, 13M, 13C, 13K, 14Y, 14M, 14C, 14K.

The image forming units 1Y, 1M, 1C, 1K are disposed vertically, and a transfer belt unit 15 is disposed on its right side in a manner contacting the OPC drums 2Y, 2M, 2C, 2K. In the transfer belt unit 15, a transfer belt 16 is stretched by rollers 17–20 and rotated by a driving source (not shown). A sheet feeding tray containing transfer sheet (transfer medium) is disposed at a lower portion of the image forming apparatus. A fixing unit 22, a sheet eject roller 23, and a sheet eject tray 24 are disposed at an upper portion of the image forming apparatus.

In a procedure of forming an image in each of the image forming units 1Y, 1M, 1C, and 1K, the OPC drums 2Y, 2M, 2C, and 2K are rotated by a driving source (not shown), are uniformly charged by the charge rollers 3Y, 3M, 3C, 3K, and are subjected to optic writing by the optic write units 8Y, 8M, 8C, 8K in accordance with image data for each color, to thereby form electro latent images on the respective OPC drums 2Y, 2M, 2C, and 2K.

The electro latent images on the respective OPC drums 2Y, 2M, 2C, and 2K are developed into respective toner images corresponding to Y, M, C, K by the developing units 4Y, 4M, 4C, 4K. The transfer sheet is, meanwhile, supplied from the sheet feeding tray 21 in a horizontal direction by a sheet feeding roller 25, and is conveyed to the image forming units 1Y, 1M, 1C, and 1K in a vertical direction by a conveying unit. The transfer belt 16, absorbing the transfer sheet with static electricity, conveys the transfer sheet. The transfer sheet conveyed on the transfer belt 16 is applied with transfer bias by a transfer bias supply unit (not shown) for allowing the respective Y, M, C, K toner images on the OPC drums 2Y, 2M, 2C, 2K to be sequentially transferred thereon in an overlapped manner, thereby resulting to the formation of a full color image on the transfer sheet. The transfer sheet has the full color image fixed thereon by a fixing unit 22, and is ejected from the sheet eject tray 24 by a sheet eject roller 23.

The aforementioned procedure is controlled by a control unit 26.

[Structure of Control Unit]

Figure 2:
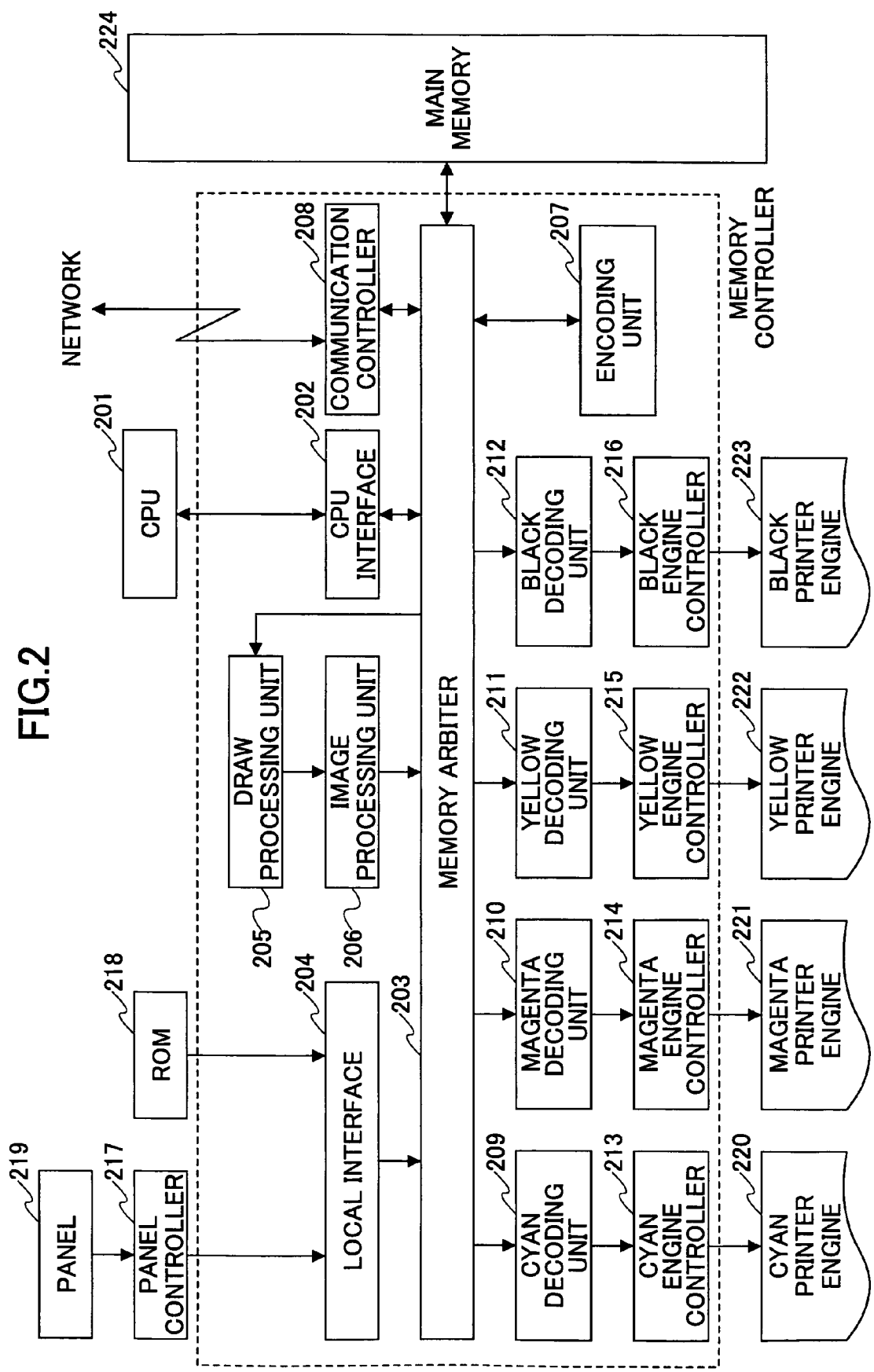
FIG. 2 is a block diagram showing an electric component control unit of an image forming apparatus according to an embodiment of the present invention.

FIG. 2 is a block diagram of the control unit 26 shown in FIG. 1.

Numeral 201 is a CPU which performs the overall controls for the color printer. Numeral 202 is a CPU interface that is connected to a memory arbiter (memory controller) 203 for serving as an interface between the CPU 201 and the memory controller 203. The memory arbiter 203 controls a main memory 224, and controls the transfer between the main memory 224 and, for example, the CPU 201, a local bus interface 204, decoding units 209 to 212, a draw processing unit 205, an image processing unit 206, and a encoding unit 207.

The local bus interface 204 serves as an interface for a ROM 218 and/or a panel controller 217 with respect to, for example, the main memory 224.

The draw processing unit 205 receives a drawing command from the CPU 201, and successively transfers memory addresses and color information (e.g. RGB, gradation) in a horizontal direction to the image processing unit 206.

The image processing unit 206 receives the memory addresses and the color information (RGB) from the draw processing unit 205, conducts image processing, and performs drawing with respect to band memory spaces in the main memory 224.

The encoding unit 207 encodes the band data in the main memory 224 and transfers the encoded data to the main memory 224.

Numeral 208 is a communication controller which is connected to a network for receiving various data and commands therefrom, and also to various controllers via the memory arbiter 203.

The decoding units 209 through 212 receive encoded data, encoded by encoding unit 207, corresponding to each C, M, Y, K, then decode the encoded data, and then transfer the decoded data to respective engine controllers 213 through 216 corresponding to C, M, Y, K.

Numeral 218 is a ROM which stores, for example, font information (e.g. letters), and programs of the CPU 201.

Numeral 217 is a panel controller which controls a panel 219.

The panel 219 informs operations of a user to, for example, a copy unit.

The respective engine controllers 213 through 216 receives images from the decoding parts 209 through 212 and transfers the images to respective printer engines 220, 221, 222, and 223 corresponding to C, M, Y, K. The main memory 224 stores, for example, code data of the encoding unit 209, programs of the CPU 201, font data, and other various data.

[Operation]

Figure 3:
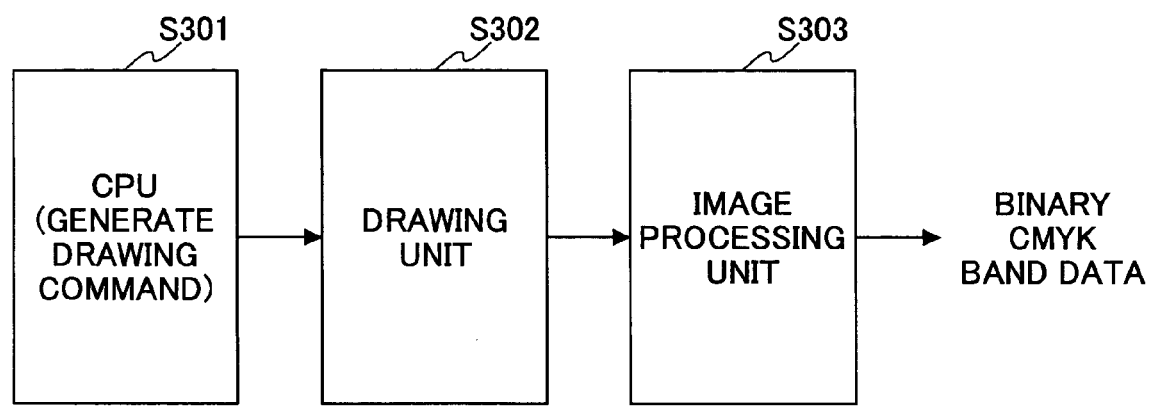
FIG. 3 is a diagram showing a flow of the procedures performed according to an embodiment of the present invention.

FIG. 3 shows an overall operation flow of an image processing apparatus according to an embodiment of the present invention.

In step S301, the CPU 201 shown in FIG. 2 generates a drawing command and transfers the drawing command to the draw processing unit 205.

In step S302, the draw processing unit 205 shown in FIG. 2 successively obtains, addresses of a horizontal direction of the band memory space and color information (RGB) values, in a vertical direction of an object, and then transfers the obtained addresses and color information (RGB) values to the image processing unit 206 shown in FIG. 2.

Figure 5:
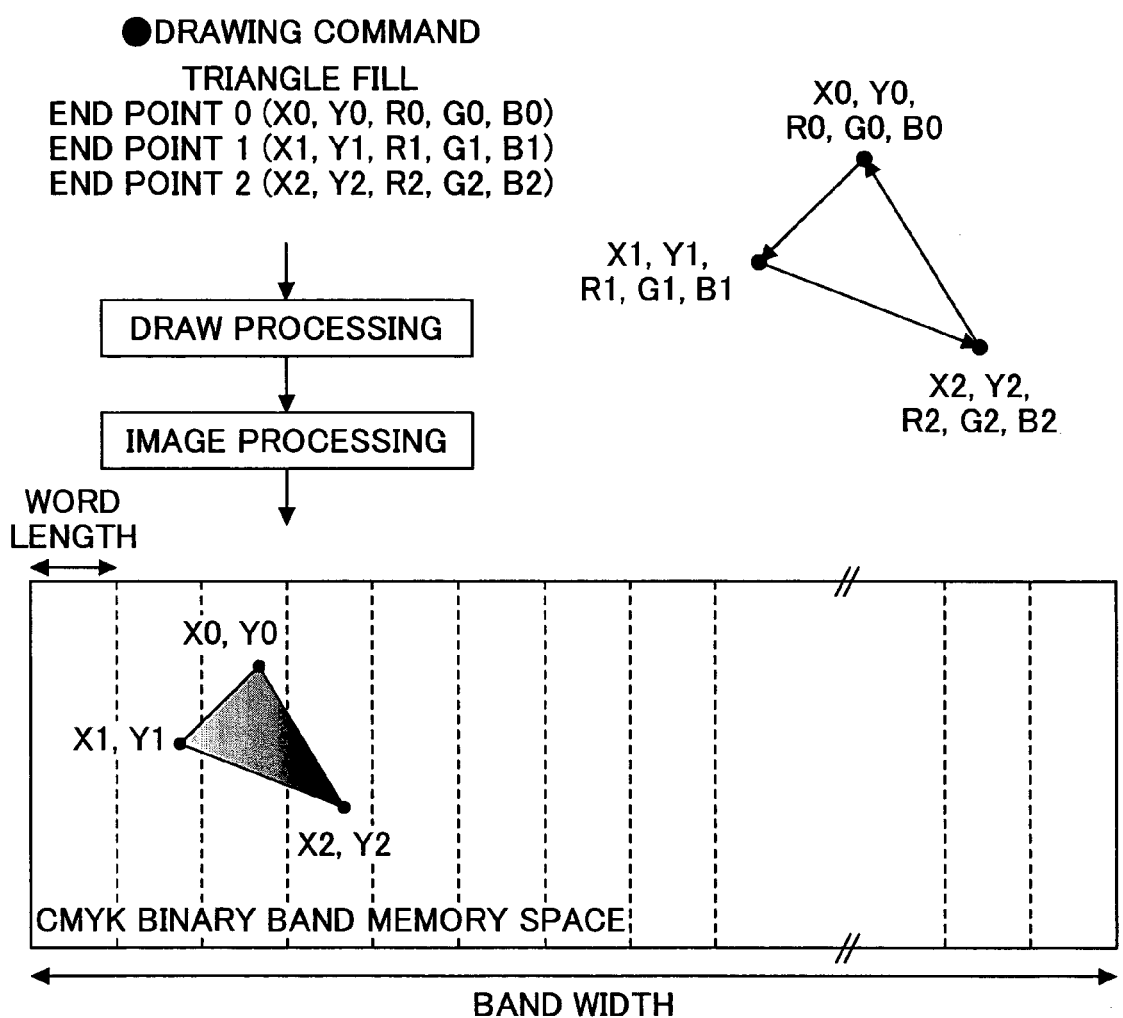
FIG. 5 is a diagram showing a concept of a procedure for drawing an object in a band memory area according to an embodiment of the present invention.

In step S303, the image processing unit 206 shown in FIG. 2 conducts image processing and draws to the CMYK binary band memory spaces shown in FIG. 5.

Figure 4:
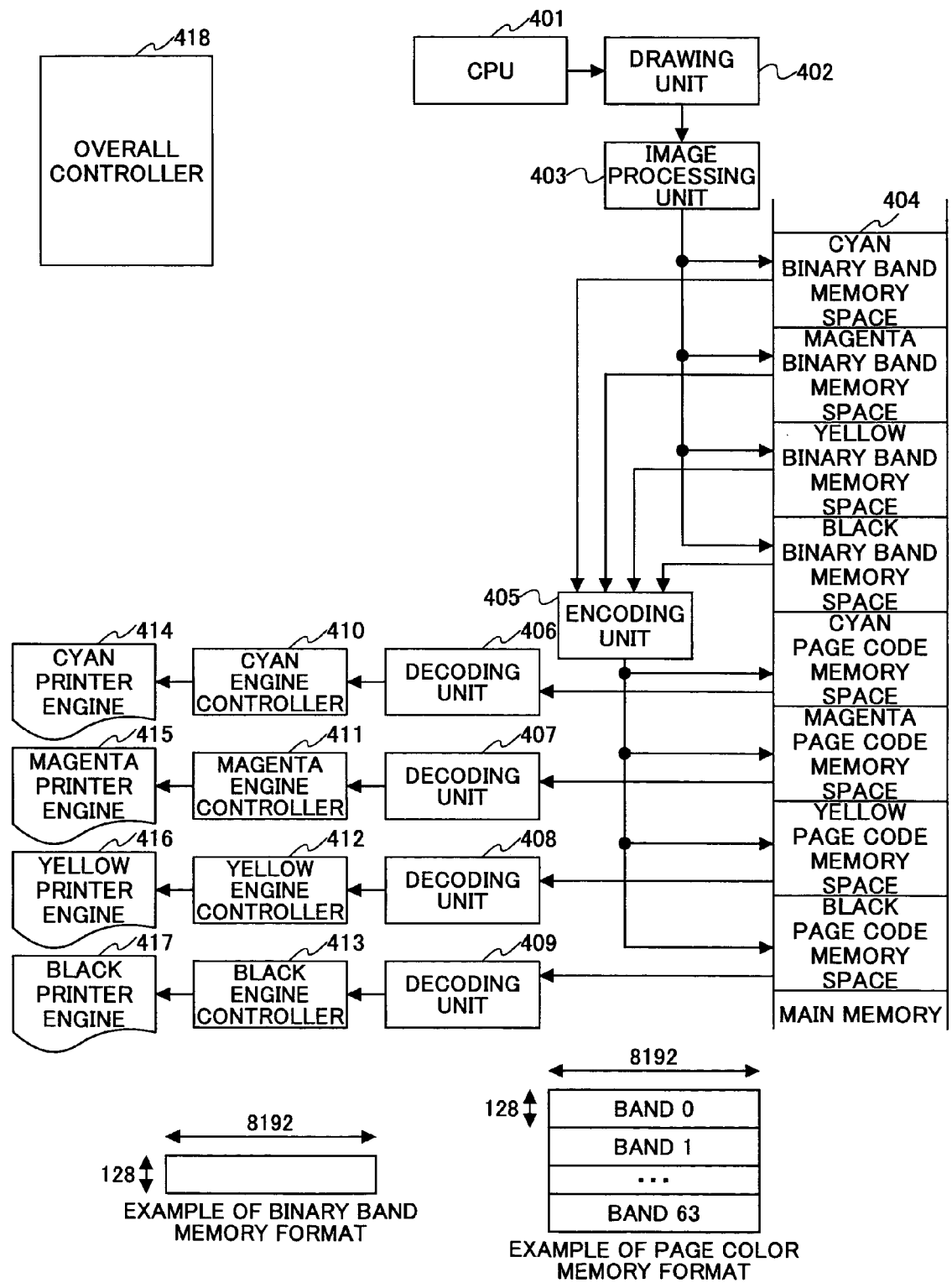
FIG. 4 is a block diagram showing a data processing concept according to an embodiment of the present invention.

FIG. 4 is a conceptual diagram showing the processes of an image processing apparatus according to an embodiment of the present invention.

Numeral 401 is a CPU which transfers a drawing command to a drawing unit 402, and performs a drawing process on halftoned band memory (main memory) 404 corresponding to C, M, Y, K.

The drawing unit 402 receives the drawing command from the CPU 401, analyzes the command, scans a graphic object successively in a horizontal direction for obtaining addresses in the band memory 404 and color information (RGB), and transfers the obtained addresses and color information (RGB) to the image processing unit 403.

The image processing unit 403 receives respective origin addresses and the thresholds of the C, M, Y, K band memories 404 from the CPU 401, receives the addresses and color information (RGB) from the draw processing unit 402, and performs a color conversion process (conversion into CMYK value). After the color conversion process (conversion to CMYK value), the image processing unit 403 generates halftoned band data to the respective band memory 404 corresponding to C, M, Y, K.

The band memory (main memory) 404 serves to store, for example, page code data corresponding to C, M, Y, K and halftoned band data.

Numeral 405 is an encoding unit which encodes halftoned band data corresponding to C, M, Y, K and transfers the data to respective page code memory spaces corresponding to C, M, Y, K in the main memory 404.

Numerals 406 through 409 are decoding units which synchronize with respective printer engines 414 through 417 corresponding to C, M, Y, K; read and decode necessary codes of C, M, Y, K from the main memory 404; and transfer the decoded codes to respective engine controllers 410 through 413 corresponding to C, M, Y, K.

The C, M, Y, K engine controllers 410 through 413 receive codes from the decoding units 406 through 409 and control the respective printer engines 414 through 417.

FIG. 5 is a conceptual diagram of a process performed according to an embodiment of the present invention. The CPU 201 shown in FIG. 2 receives a drawing command, transfers the drawing command to the draw processing unit 205. The draw processing unit 205 performs a drawing process and transfers processed results to the image processing unit 206 shown in FIG. 2. The image processing unit 206 draws an object to a halftoned band memory corresponding to C, M, Y, K in the main memory 224 shown in FIG. 2.

[Main Memory Format]

Figure 6:
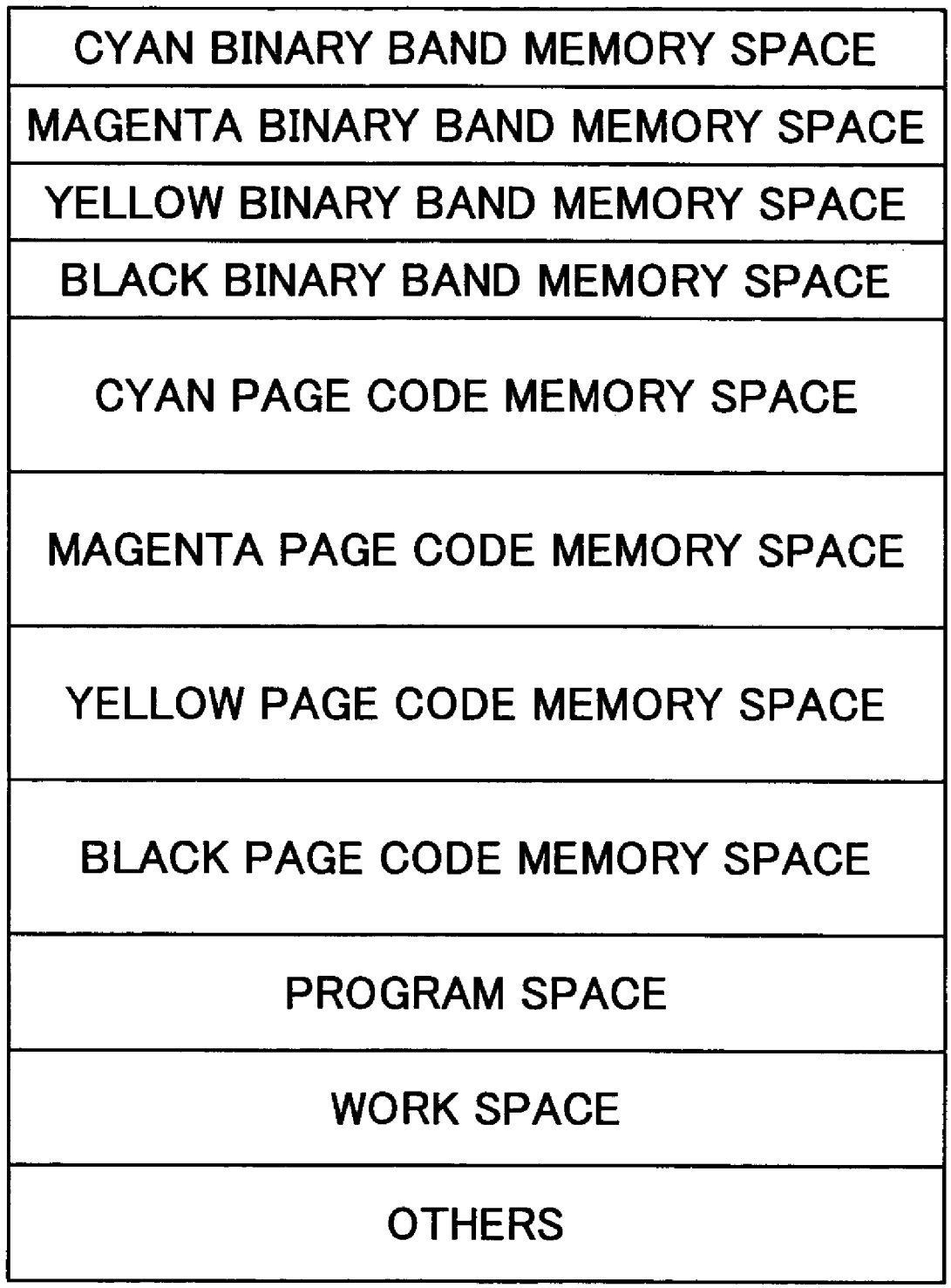
FIG. 6 is a diagram showing a format of a main memory according to an embodiment of the present invention.

FIG. 6 shows a format of a main memory according to an embodiment of the present invention.

With reference to FIG. 6, the C, M, Y, K binary band memory spaces are spaces which store image processed (processed into, for example, binary value, quaternary value, or hexadecimal value) band information corresponding to C, M, Y, K.

The cyan binary band memory space is a space storing halftoned encoded data of a cyan band that amount to plural pages.

The magenta binary band memory space is a space storing halftoned encoded data of a magenta band that amount to plural pages.

The yellow binary band memory space is a space storing halftoned encoded data of a yellow band that amount to plural pages.

The black binary band memory space is a space storing halftoned encoded data of a black band that amount to plural pages.

The program space is a space storing various programs of a CPU.

[Drawing Process]

Figure 7:
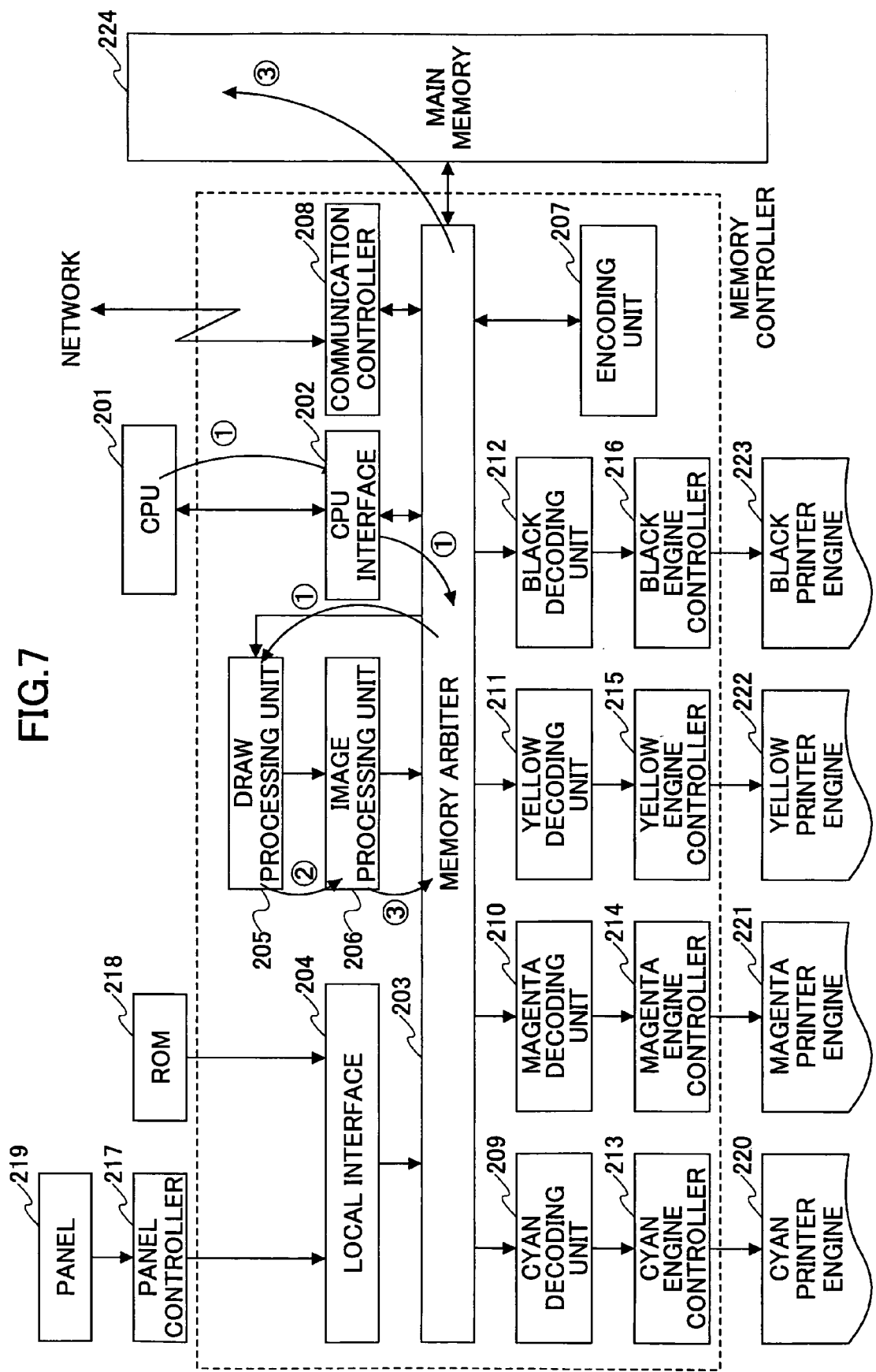
FIG. 7 is a diagram showing a flow of draw processing according to an embodiment of the present invention.

FIG. 7 shows a flow of a drawing process according to an embodiment of the present invention.

The CPU 201 transfers a drawing command to the draw processing unit 205 (①).

The draw processing unit 205 analyzes the drawing command and transfers color information of an object and a memory address thereof to the image processing unit 206 (②).

The image processing unit 206 performs image processing to the color information from the draw processing unit 205, and provides the image processed data to the C, M, Y, K binary band memory spaces of the main memory (③).

[Drawing Unit]

Figure 8:
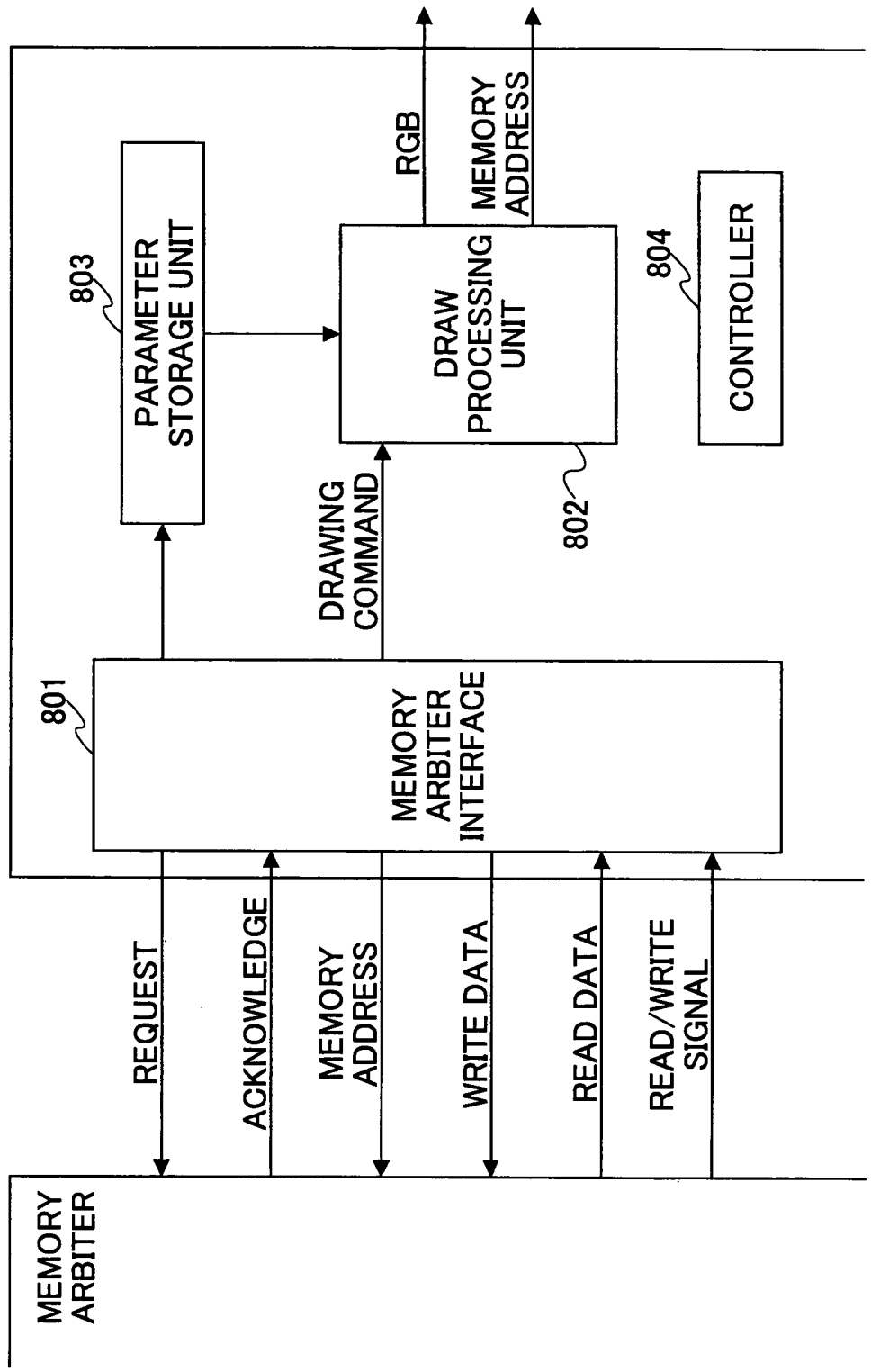
FIG. 8 is a block diagram of the drawing unit shown in FIG. 2.

FIG. 8 is a block diagram of the draw processing unit 205 shown in FIG. 2.

Numeral 801 is a memory arbiter interface serving as an interface with respect to the memory arbiter 203 shown in FIG. 2. The memory arbiter interface 801 receives a drawing command from the CPU 201 shown in FIG. 2 and transfers the drawing command to a draw processing unit 802. In FIG. 8, the memory arbiter 203 receives a request signal requesting access to the main memory 224. The memory arbiter 203 returns an acknowledge signal for informing that preparation is made for accessing to the main memory 224.

The draw processing unit 802 receives the drawing command from the CPU 201 shown in FIG. 2, analyzes the drawing command, and obtains the differential coefficients, for a horizontal direction (dRX, dGX, dBX) and a vertical direction (dRY, dGY, dBY), from a plane equation in accordance with color information of each endpoint of a triangle object, to thereby successively obtain the memory addresses and color information (RGB) in a horizontal direction, from a vertical direction, and transfer the obtained memory addresses for each pixel to the image processing unit 206 shown in FIG. 2 in accordance with bandwidth of band data and logical addresses (X0, Y0, X1, Y1, X2, Y2) of each endpoint of a graphic shape.

In the block diagram of FIG. 8, numeral 803 is a parameter storage unit for temporarily storing parameters of the draw processing unit 802. Numeral 804 is a controller for entirely controlling the draw processing unit 205.

Figure 9:
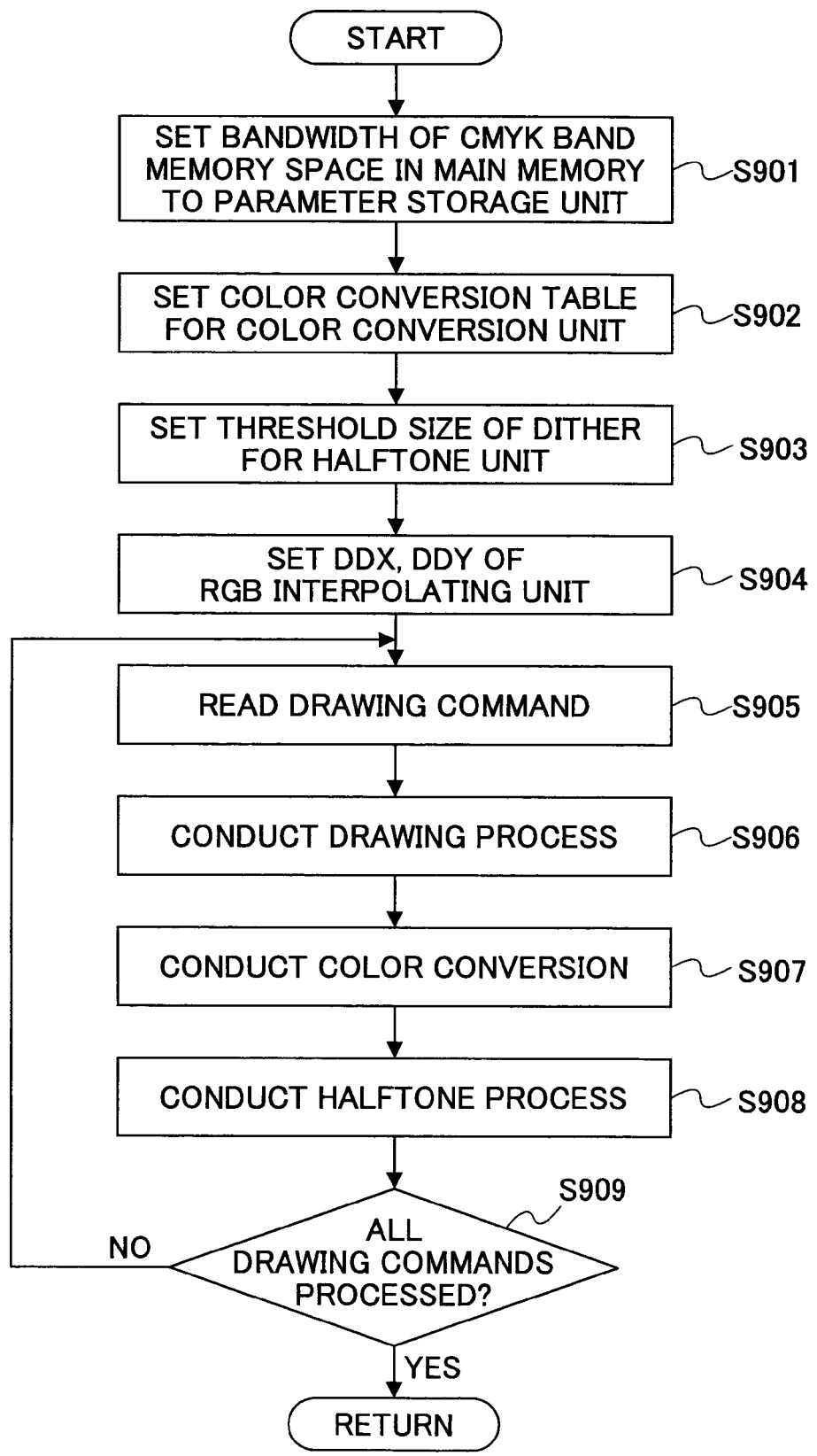
FIG. 9 is a flow chart showing a process performed with a drawing unit according to an embodiment of the present invention.

FIG. 9 shows a processing flow of the drawing processing unit according to an embodiment of the present invention.

Step S901: Set bandwidth of respective C, M, Y, K band memory spaces in a main memory to a parameter storage unit.

Step S902: Set a color conversion table for a color conversion unit.

Step S903: Set threshold size of dither for a halftone unit.

Step S904: Set values of DDX and DDY for an RGB interpolating unit.

Step S905: Read drawing command.

Step S906: Conduct drawing process.

Step S907: Conduct color conversion.

Step S908: Conduct halftone process (halftoning).

Step S909: Withdraw from loop after all drawing commands are conducted.

[Draw Processing Unit]

Figure 10:
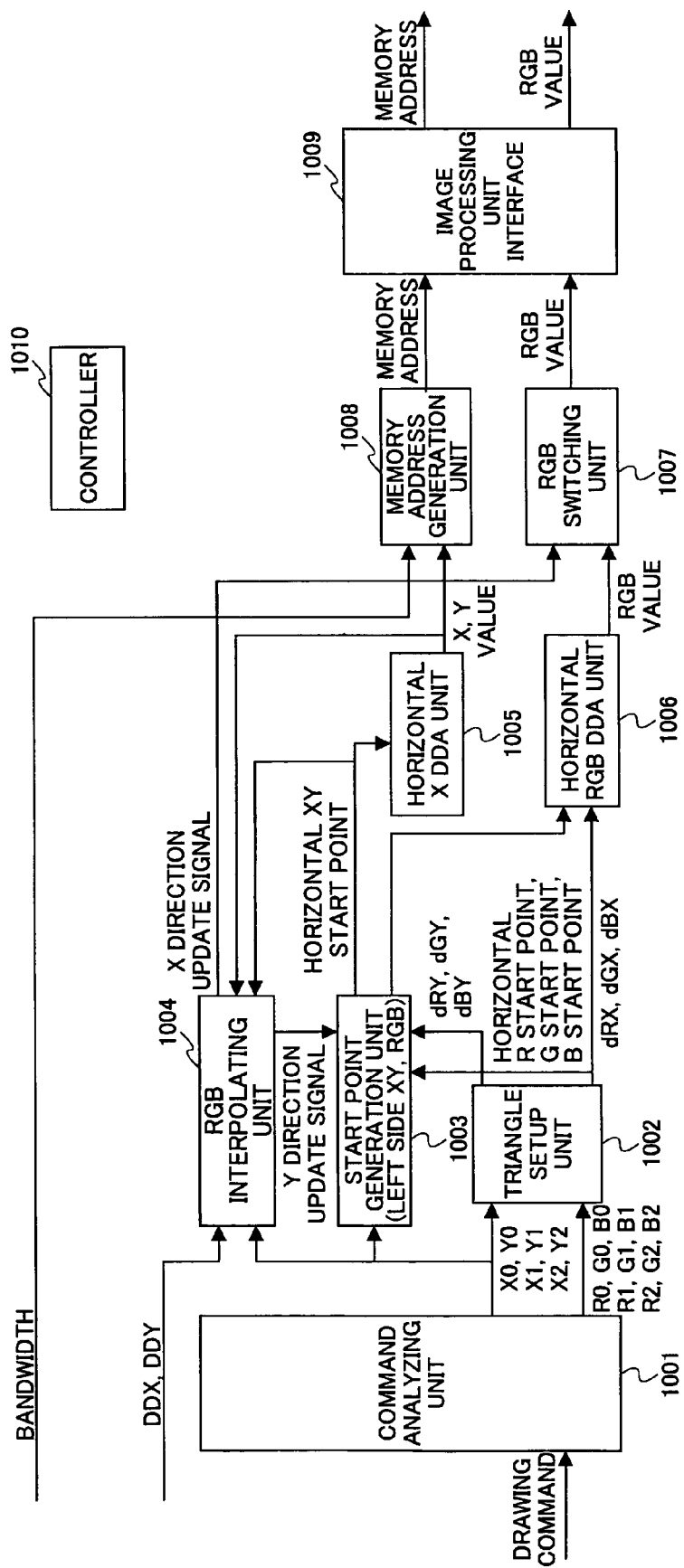
FIG. 10 is a block diagram showing a structure of a draw processing unit shown in FIG. 8.

FIG. 10 is a block diagram of the draw processing unit 802 shown in FIG. 8.

Numeral 1001 is a command analyzing unit which analyzes a drawing command from the CPU 201 shown in FIG. 2, obtains coordinates (X0, Y0, X1, Y1, X2, Y2) and color information (R0, G0, B0, R1, G1, B1, R2, G2, B2) for each endpoint of a triangle, and transfers the coordinates and the color information to, for example, a triangle setup unit 1002, a start point generation unit 1003, and an RGB interpolating unit 1004.

The triangle setup unit 1002 obtains differential coefficients for a horizontal direction (dRX, dGX, dBX) and a vertical direction (dRY, dGY, dBY) from a plane equation of a triangle in accordance with the coordinates and color information of each endpoint obtained from the command analyzing unit 1001, and transfers the obtained differential coefficients to the start point generation unit 1003 and the RGB interpolating unit 1004.

Figure 27:
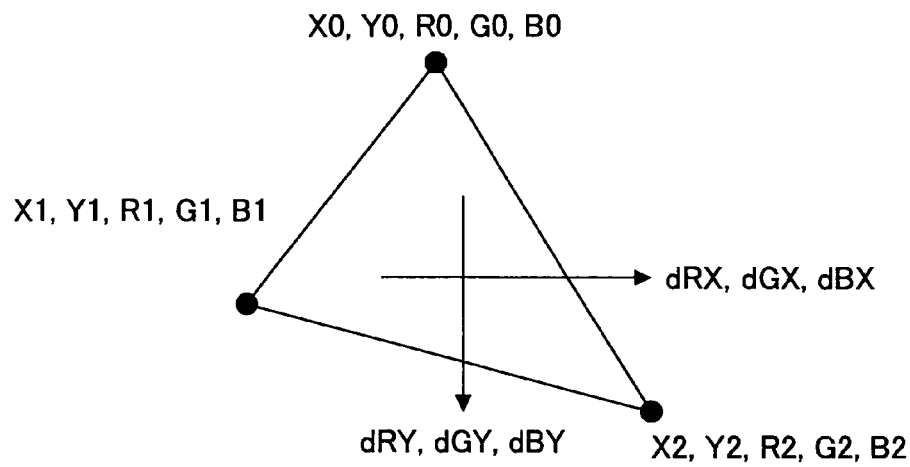
FIG. 27 is a diagram showing a relation between coordinates of a triangle on a plane, color information, and difference.

Obtaining the differential coefficients for the horizontal and vertical directions from the plane equation of a triangle is described with reference to FIG. 27 and Equation 1 given below.

$$\frac{dR}{dX} = \frac{(R2-R0)(X1-X0)+(R1-R0)(X2-X0)}{(Y2-Y0)(X1-X0)+(Y1-Y0)(X2-X0)}$$ Equation 1

$$\frac{dR}{dY} = \frac{(R2-R0)(Y1-Y0)+(R1-R0)(Y2-Y0)}{(Y2-Y0)(X1-X0)+(Y1-Y0)(X2-X0)}$$

-continued $$\frac{dG}{dX} = \frac{(G2-G0)(X1-X0)+(G1-G0)(X2-X0)}{(Y2-Y0)(X1-X0)+(Y1-Y0)(X2-X0)}$$

$$\frac{dG}{dY} = \frac{(G2-G0)(Y1-Y0)+(G1-G0)(Y2-Y0)}{(Y2-Y0)(X1-X0)+(Y1-Y0)(X2-X0)}$$

$$\frac{dB}{dX} = \frac{(B2-B0)(X1-X0)+(B1-B0)(X2-X0)}{(Y2-Y0)(X1-X0)+(Y1-Y0)(X2-X0)}$$

$$\frac{dB}{dY} = \frac{(B2-B0)(Y1-Y0)+(B1-B0)(Y2-Y0)}{(Y2-Y0)(X1-X0)+(Y1-Y0)(X2-X0)}$$

Figure 29:
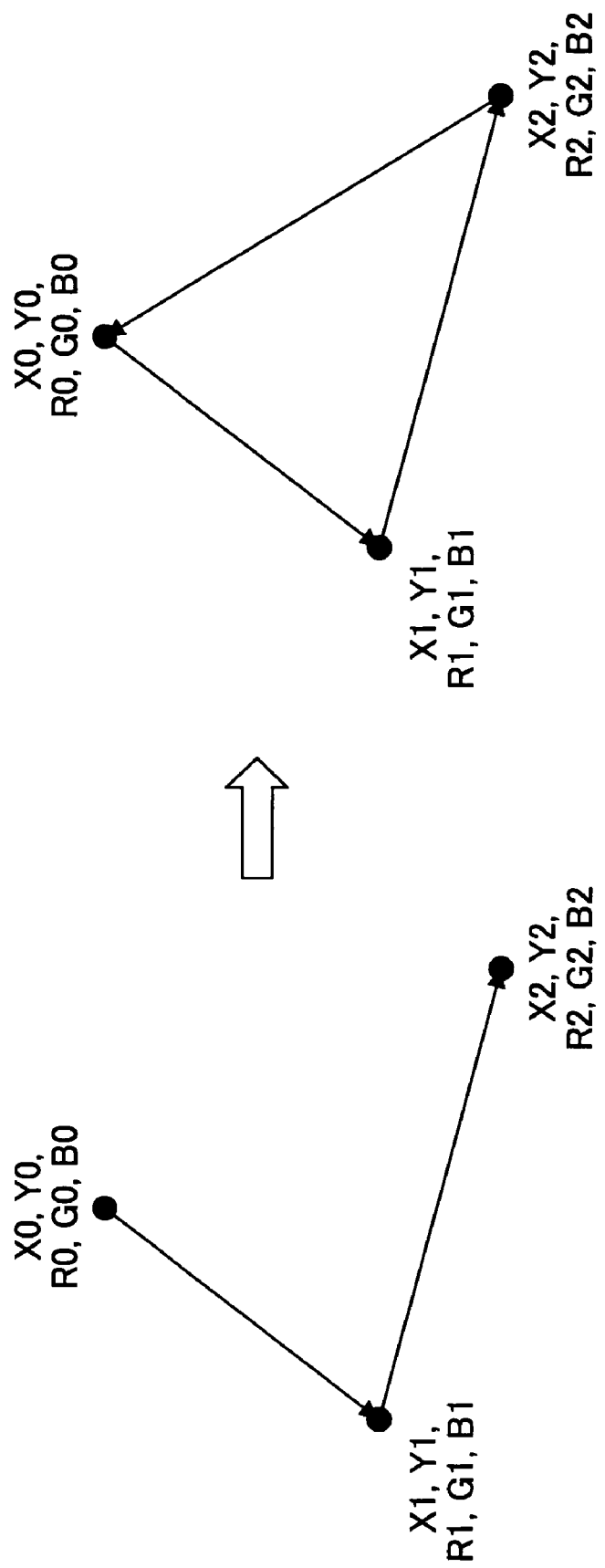
FIG. 29 is a diagram showing a process of interpolating the sides of a triangle from initial point (X0, Y0), and drawing the triangle according to an embodiment of the present invention.
Figure 30:
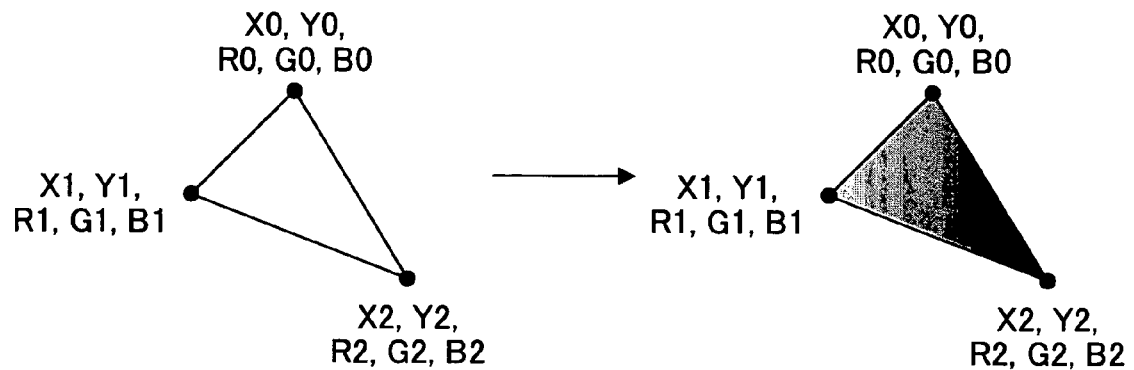
FIG. 30 is a diagram showing an example of a triangle gradient fill.
Figure 31:
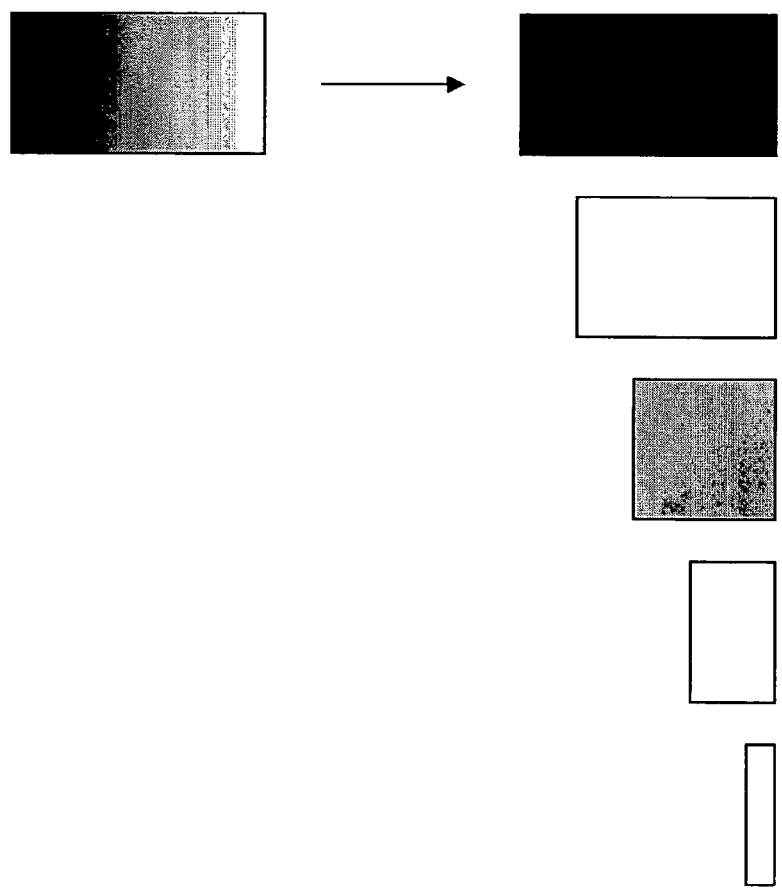
FIG. 31 is a diagram showing an example of forming a gradation from plural gradation patterns.
Figure 32:
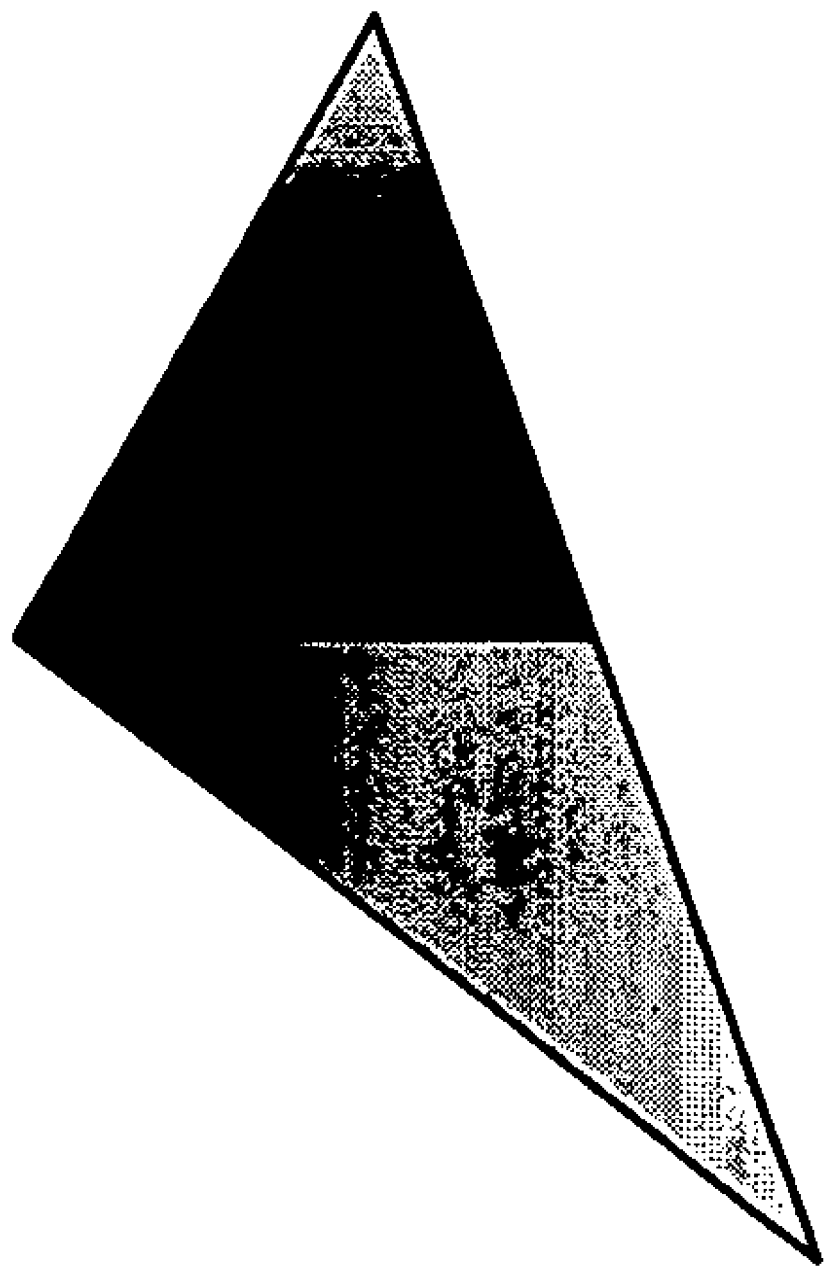
FIG. 32 is a diagram showing a result of gradient fill in a case where interpolation is performed according to the left and right sides of a triangle.

The start point generation unit 1003 determines a left side of the triangle (in a case where the triangle is a counter-clockwise triangle as shown in FIG. 29) in accordance with the coordinates of each endpoint of the triangle (X0, Y0, X1, Y1, X2, Y2) received from the command analyzing unit 1001, successively obtains the values of start point X and R,G,B values in a horizontal direction from a vertical direction of the left side, and transfers the obtained values to a horizontal X DDA unit 1005 and a horizontal RGB DDA unit 1006.

The RGB interpolating unit 1004 forms a mesh by dividing a square surrounding the triangle (See FIG. 28) into units of minimum color length DDY in a vertical direction and minimum color length DDX in a horizontal direction in accordance with the coordinates of each of the endpoints of the triangle (X0, Y0, X1, Y1, X2, Y2) received from the command analyzing unit 1001. Based on the mesh, the RGB interpolating unit 1004 sends a Y direction update signal to the start point generation unit 1003 when the values of horizontal start point X and Y output from the start point generation unit 1003, crosses over the mesh (border) in a vertical direction, to thereby update the RGB values for a horizontal direction that are transferred from the start point generation unit 1003 to the horizontal XDDA unit 1005 and the horizontal RGB DDA unit 1006.

Further, the RGB interpolating unit 1004 overlooks the X value of each horizontal pixel of the horizontal XDDA unit 1005 and sends an X direction update signal to an RGB switching unit 1007 when the X value crosses over the mesh (border) in a horizontal direction, to thereby render the RGB switching unit 1007 to update the RGB value that is output from the horizontal RGB DDA 1006.

Although a typical computation is employed to compute resolution for the sides of the object, resolution can be modified for the object having an inside thereof filled.

The horizontal XDDA unit 1005 receives horizontal start point X value, Y value from the start point generation unit 1003, scans the triangle in a horizontal direction, successively obtains the X values of each pixel by DDA (Digitial Differential Analysis), and transfers the obtained X values to the RGB interpolating unit 1004 and the memory address generation unit 1008.

The horizontal RGB DDA unit 1006 receives differential coefficients dRX, dGX, dBX from the triangle setup unit 1002 and the RGB horizontal start point values from the start point generation unit 1003, and interpolates the RGB of each pixel in the horizontal direction by DDA. The horizontal RGB DDA unit 1006, then, transfers the interpolated RGB values to the RGB switching unit 1007.

The RGB switching unit 1007 updates the interpolated RGB values received from the horizontal RGB DDA unit 1006 according to the X direction update signals from the RGB interpolating unit 1004.

The memory address generation unit 1008 converts the logical coordinates (addresses) of the band memory from the horizontal XDDA (X, Y) into physical coordinates (addresses) of the band memory in accordance with the bandwidth of the band memory, and transfers the converted coordinates to the image processing unit interface 1009.

The image processing unit interface 1009 transfers the addresses from the memory address generation unit 1008 and the RGB values from the RGB switching unit 1007 to the image processing unit 206 shown in FIG. 2.

Numeral 1010 is a controller which entirely controls the draw processing unit 205 shown in FIG. 2.

[Draw Processing Flow]

Figure 11:
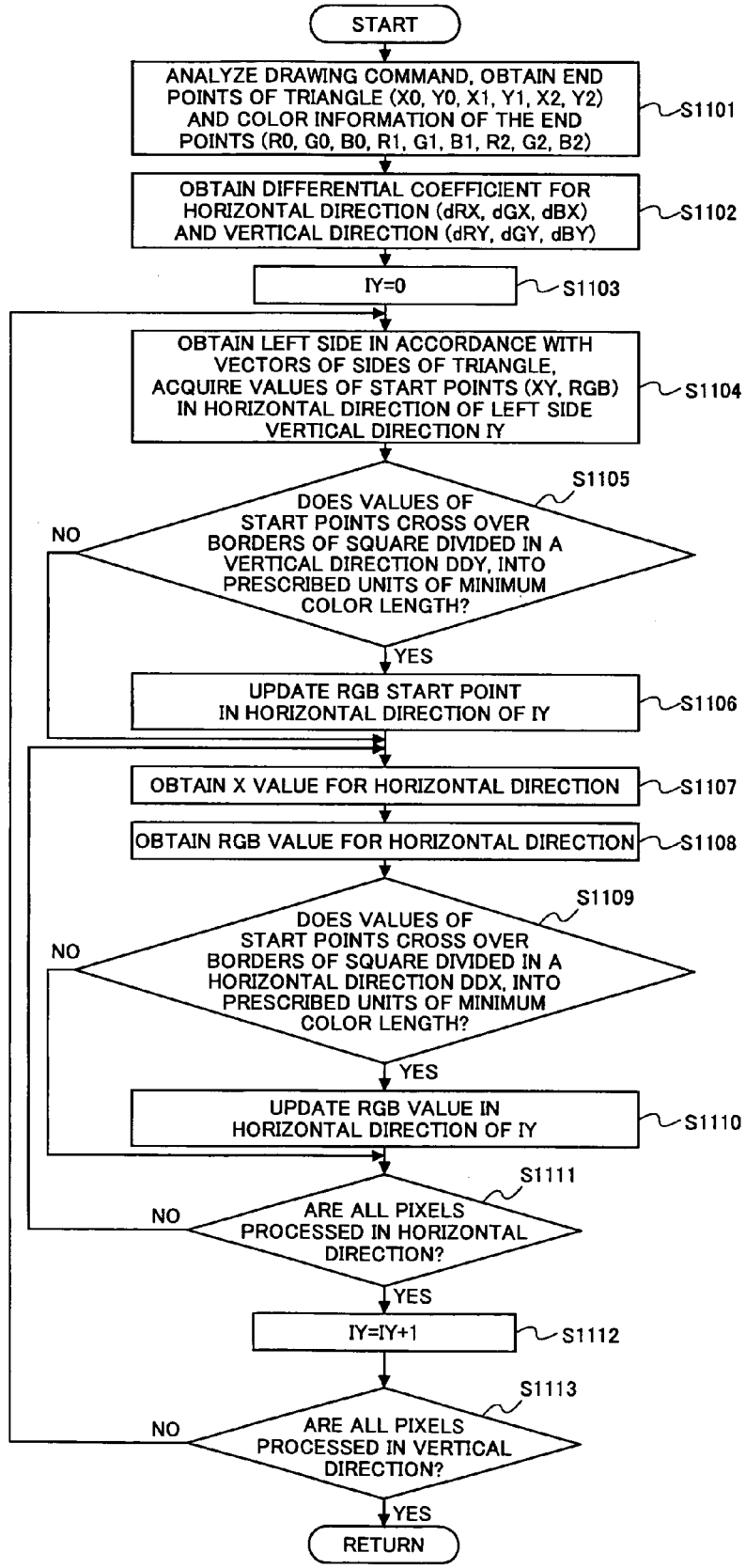
FIG. 11 is a flow chart showing a process performed with a draw processing unit according to an embodiment of the present invention.

FIG. 11 shows a processing flow of a draw processing unit according to an embodiment of the present invention.

Step S1101: A command analyzing unit analyzes a drawing command, and obtains endpoints of a triangle (X0, Y0, X1, Y1, X2, Y2) and color information of the endpoints (R0, G0, B0, R1, G1, B1, R2, G2, B2).

Step S1102: A triangle setup unit obtains differential coefficients for a horizontal direction dRX, dGX, dBX and differential coefficients for a vertical direction dRY, dGY, dBY.

Step S1103: Set initial value (Initialize).

Step S1104: A start point generation unit obtains a left side in accordance with vectors of the sides of the triangle, and acquires the values of start points in a horizontal direction (XYRGB) of a vertical direction IY of the left side.

Step S1105: An RGB interpolating unit determines whether the values of the start points crosses over boundaries of the square, which surrounds the triangle and is divided into prescribed units of minimum color length in a vertical direction DDY.

Step S1106: Update RGB start point value in horizontal direction of IY.

Step S1107: A horizontal XDDA unit obtains an X value in a horizontal direction.

Step S1108: A horizontal RGB DDA unit obtains an RGB value in a horizontal direction.

Step S1109: The RGB interpolating unit determines whether the values of the start points cross over boundaries of the square, surrounds the triangle and is divided into prescribed units of minimum color length in a horizontal direction DDX.

Step S1110: Update RGB value in a horizontal direction of IY.

Step S1111: Determine whether all pixels are processed in a horizontal direction.

Step S1112: Add 1 to the value of IY.

Step S1113: Determine whether all pixels are processed in a vertical direction.

[Triangle Setup Unit]

Figure 12:
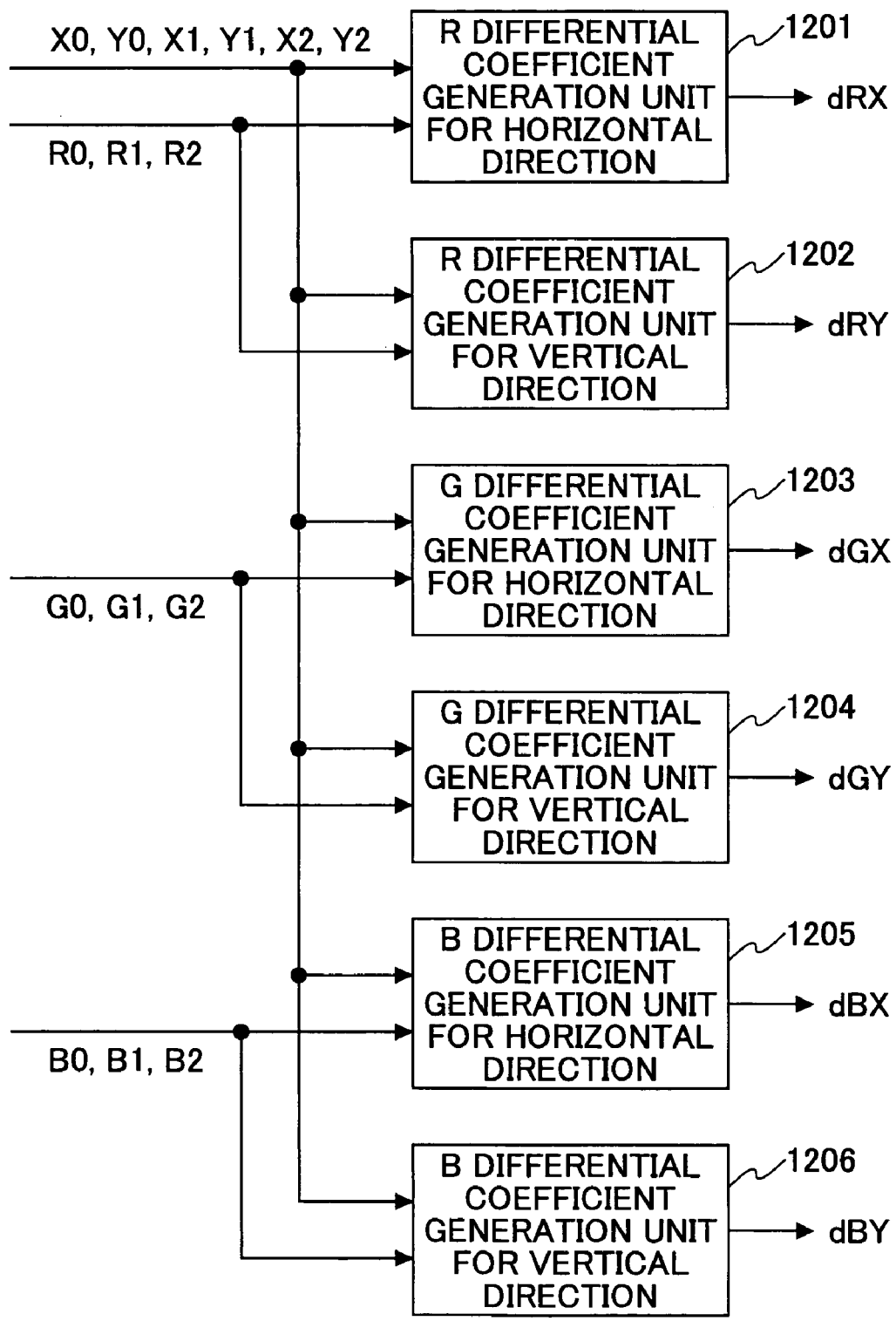
FIG. 12 is a block diagram showing a structure of a triangle setup unit shown in FIG. 10.

FIG. 12 is a block diagram of the triangle setup unit 1002 shown in FIG. 10.

Numeral 1201 is an R horizontal differential coefficient generation unit that generates the value of a differential coefficient (R) for a horizontal direction dRX from a plane equation of a triangle.

Numeral 1202 is an R vertical differential coefficient generation unit that generates the value of a differential coefficient (R) for a vertical direction dRY from a plane equation of a triangle.

Numeral 1203 is a G horizontal differential coefficient generation unit that generates the value of a differential coefficient (G) for a horizontal direction dGX from a plane equation of a triangle.

Numeral 1204 is a G vertical differential coefficient generation unit that generates the value of a differential coefficient (G) for a vertical direction dGY from a plane equation of a triangle.

Numeral 1205 is a B horizontal differential coefficient generation unit that generates the value of a differential coefficient (B) for a horizontal direction dBX from a plane equation of a triangle.

Numeral 1206 is a B vertical differential coefficient generation unit that generates the value of a differential coefficient (B) for a vertical direction dBY from a plane equation of a triangle.

[Horizontal Differential Coefficient Generation Unit]

Figure 13:
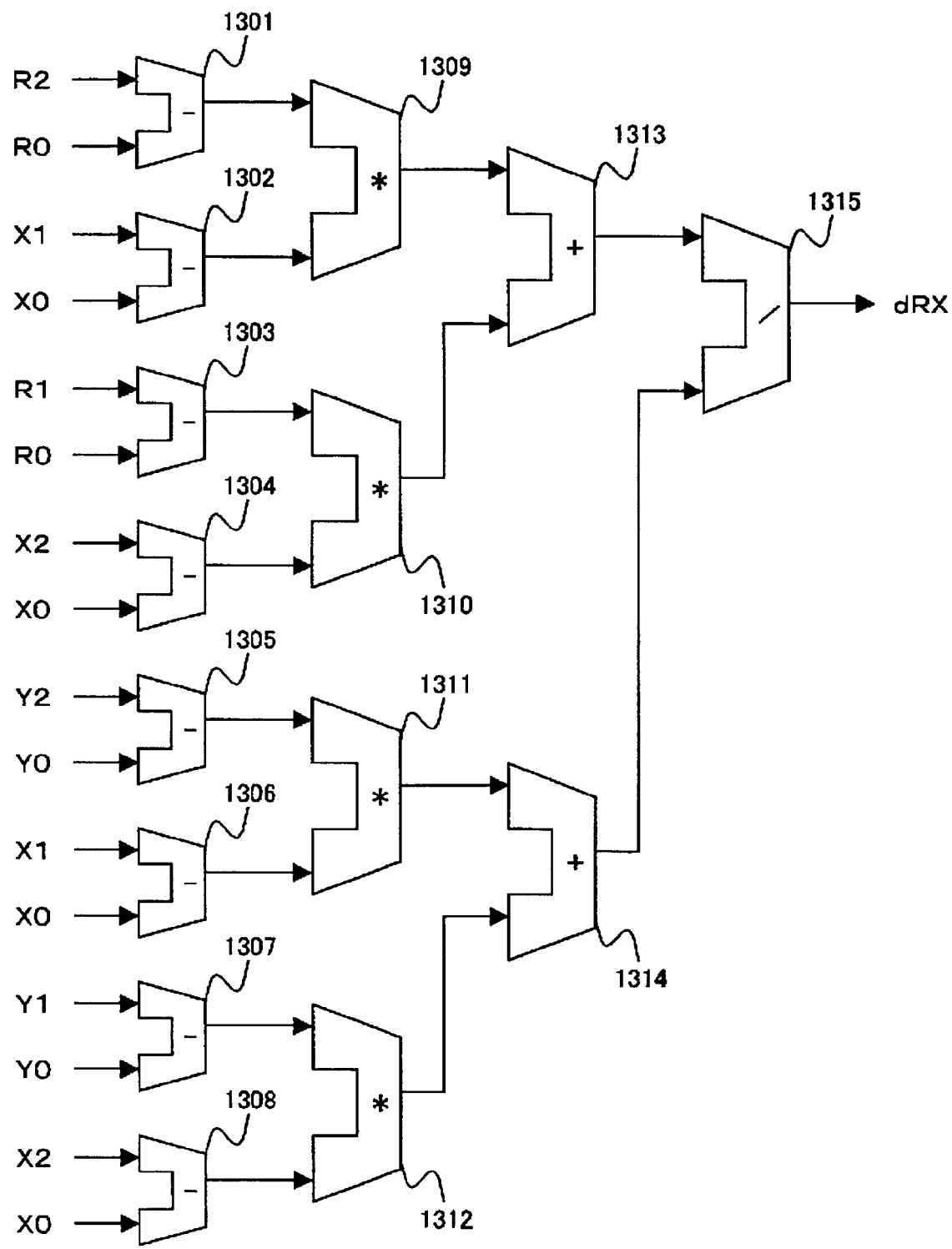
FIG. 13 is a block diagram showing a structure of a generation unit 1201 shown in FIG. 12 that generates difference R for a horizontal direction.

FIG. 13 is a block diagram showing the R horizontal differential coefficient generation unit 1201 shown in FIG. 12. The block diagram expresses the equation of dR/dX in Equation 1 in the form of hardware.

[Vertical Differential Coefficient Generation Unit]

Figure 14:
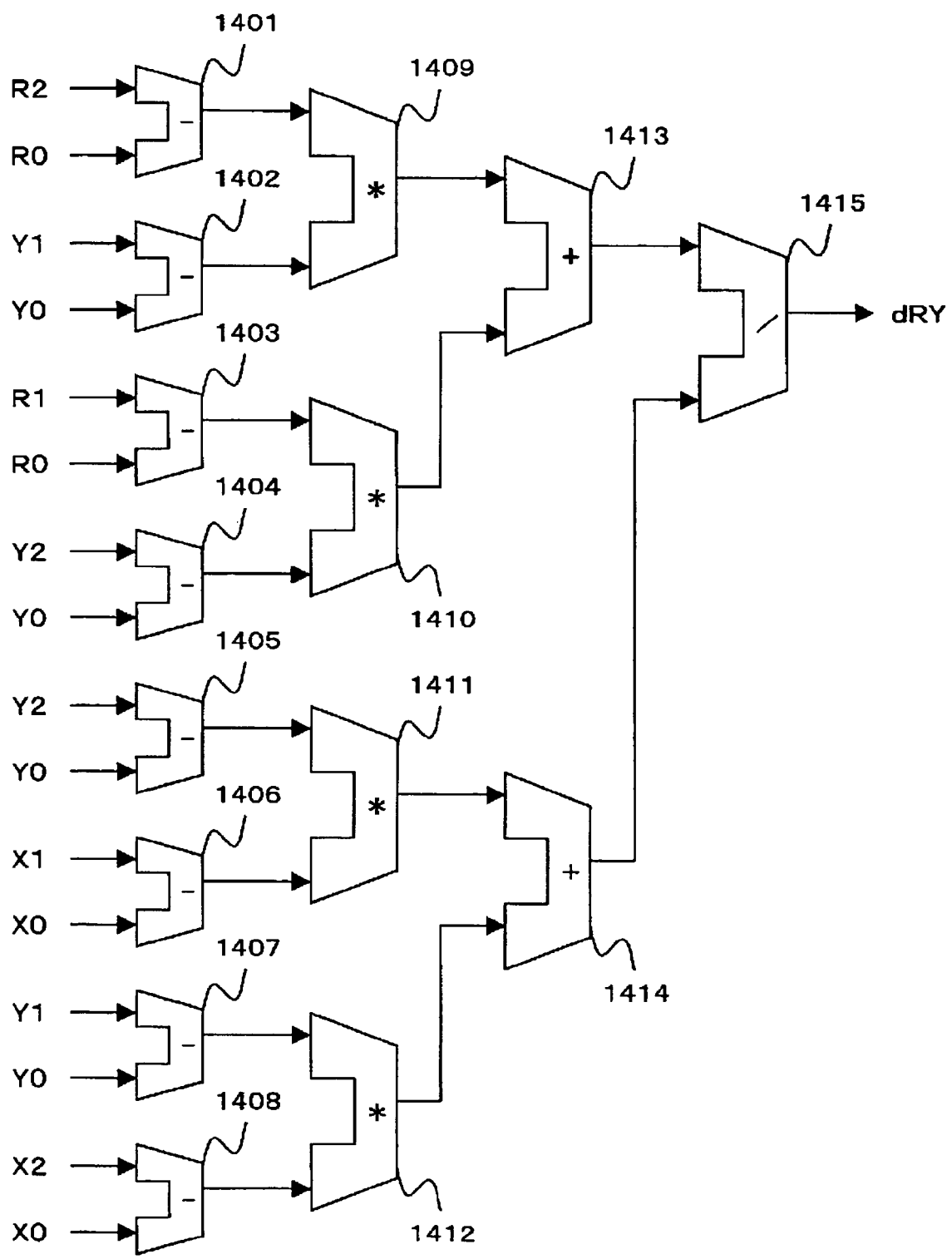
FIG. 14 is a block diagram showing a structure of a generation unit 1202 shown in FIG. 12 that generates difference R for a vertical direction.

FIG. 14 is a block diagram showing the R vertical differential coefficient generation unit 1202 shown in FIG. 12. The block diagram expresses the equation of dR/dY in Equation 1 in the form of hardware.

[Horizontal RGB DDA Unit]

Figure 15:
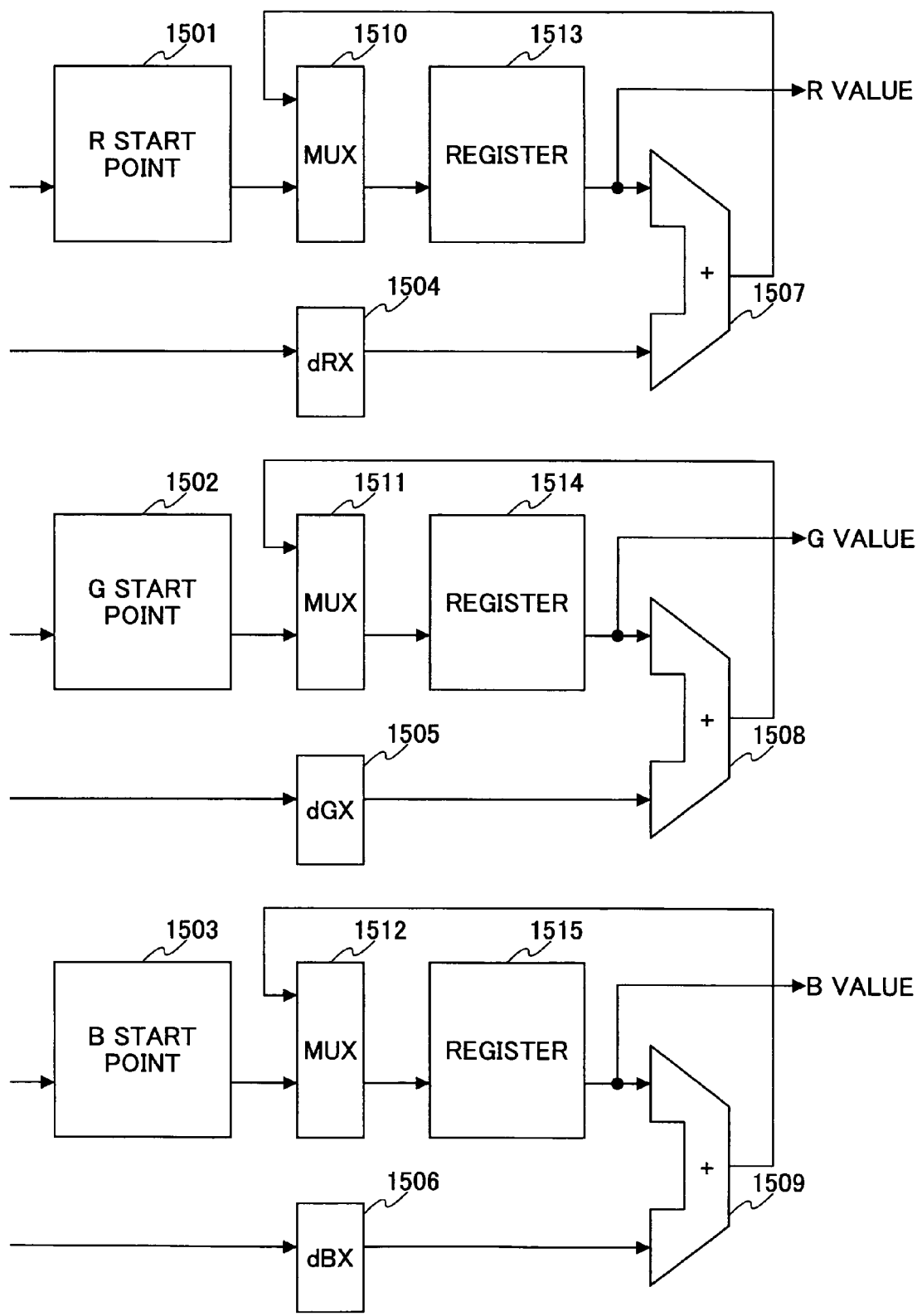
FIG. 15 is a block diagram showing a structure of a horizontal RGB DDA unit 1006 shown in FIG. 10.

FIG. 15 is a block diagram showing the horizontal RGB DDA unit 1006 shown in FIG. 10.

Numerals 1501 through 1503 are registers which store start point values of RGB values in a horizontal direction from the start point generation unit 1003 shown in FIG. 10.

Numerals 1504 to 1506 are registers which store differential coefficients of RGB values in a horizontal direction from the triangle setup unit 1002 shown in FIG. 10.

Numerals 1507 through 1509 are adders which conduct addition for performing respective DDA processing for R, G, and B.

Numerals 1510 through 1512 are frame memory address multiplexers (MUX) which transfer the start point values of RGB 1501 through 1503 to the registers 1513 through 1515 as initial values in the respective DDA processing for R, G, and B, and then transfers the output of the adders 1507 through 1509 during the DDA processing to the registers 1513 through 1515.

The registers 1513 through 1515 store process results of the respective DDA processing for R, G, and B.

[Start Point Generation Unit]

Figure 16:
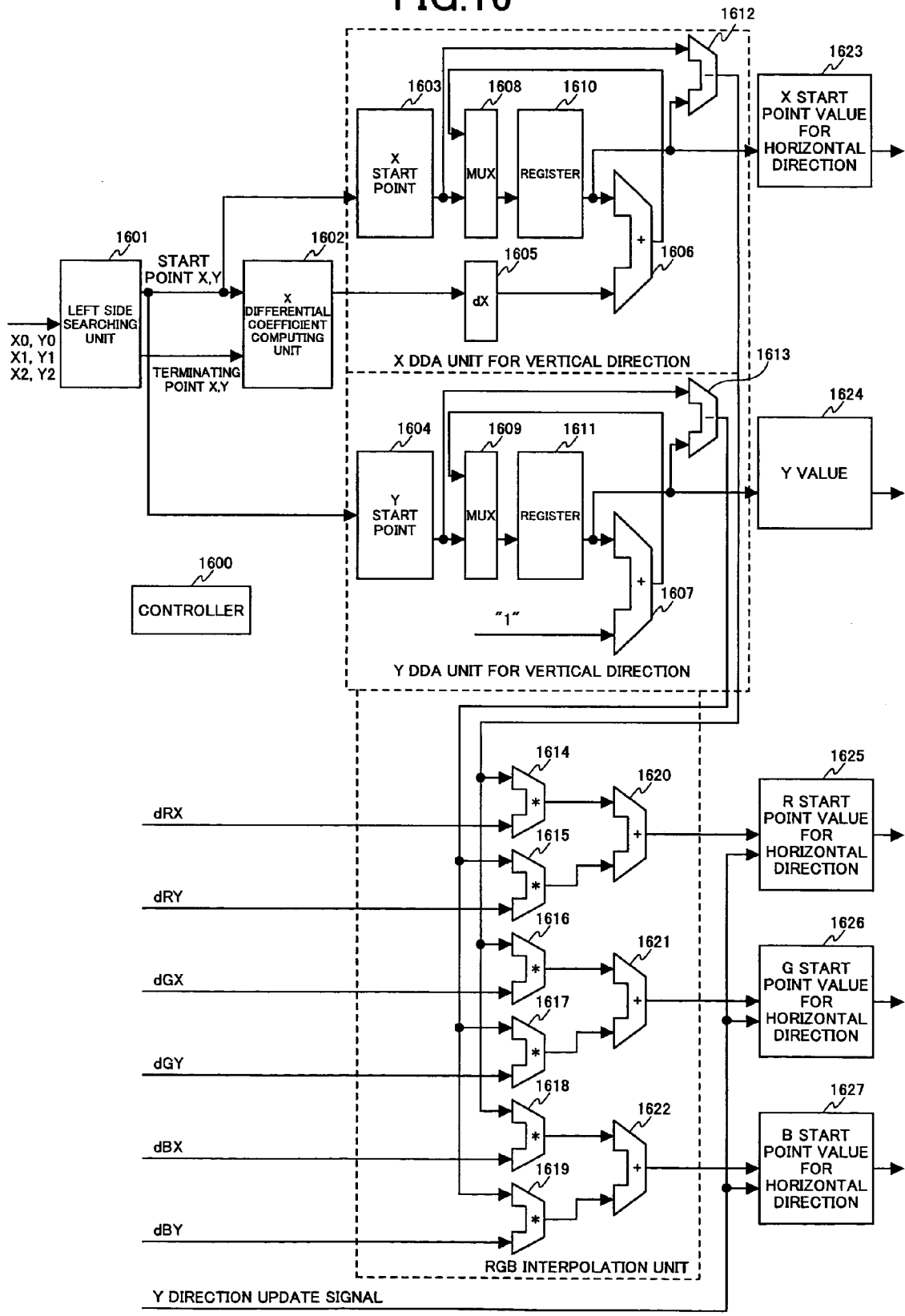
FIG. 16 is a block diagram showing a structure of an initial point generation unit 1003 shown in FIG. 10.

FIG. 16 shows a block diagram of the start point generation unit 1003 shown in FIG. 10.

Numeral 1601 is a left side searching unit which determines a left side by referring to the vectors of endpoints of the sides of a triangle, transfers a start point (X, Y) and an end point (X, Y) to a X differential coefficient computing unit 1602, and transfers values of X, Y to the registers 1603 and 1604.

The process is continued until there are no more left sides remaining.

The X differential coefficient computation unit 1602 receives the start point (X, Y) and the terminating point (X, Y) from the left side searching unit 1601, obtains the differential coefficient in the vertical direction (terminating point X−start point X)/(terminating point Y−start point Y), and transfers the obtained differential coefficient to the register 1605.

The register 1603 stores the value of the start point X from the left side searching unit 1601.

The register 1604 stores the value of the start point Y from the left side searching unit 1601.

The register 1605 stores the value of the differential coefficient X from the X differential coefficient computing unit 1602.

The adder 1606 performs the adding process of the DDA for X in a vertical direction.

The adder 1607 performs the adding process of the DDA for Y in a horizontal direction.

Numeral 1608 is a frame memory address multiplier (MUX) which transfers the start point values X of the register 1603 to a register 1610 as initial values in the DDA processing for X in a vertical direction, and then, during the DDA processing, transfers the output of the adders 1606 to the register 1610.

Numeral 1609 is an MUX (frame memory address multiplexer) which transfers the start point values of Y of the register 1604 to the register 1611 as initial values in the DDA processing for Y in a vertical direction, and then, during the DDA processing, transfers the output of the adders 1606 to the register 1611.

The register 1610 stores process results of the DDA processing of X in the vertical direction.

The register 1611 stores process results of the DDA processing of Y in the vertical direction.

Numeral 1612 is a subtractor which subtracts the value of the start point X from the process results of the DDA processing of X in a vertical direction 1610, obtains X differential coefficient from the start point of the left side that is being subjected to processing, and transfers the obtained X differential coefficient to the multipliers of the RGB interpolating units 1615, 1617, and 1619.

Numerals 1614 through 1622 are RGB interpolating units which perform plane interpolation in accordance with the differential coefficients in the X, Y directions obtained in 1612 and 1613, and the differential coefficients obtained by the triangle setup unit 1002 in FIG. 10. The RGB interpolating units 1614 through 1622, thereby, obtain an RGB start point of the left side for the horizontal direction.

Numeral 1614 is a multiplier which multiplies the differential coefficient value for the horizontal direction dRX obtained from the triangle setup unit 1002 shown in FIG. 10 and the differential coefficient value for the vertical direction X obtained from the subtractor 1612, and transfers the multiplication result to the adder 1620.

Numeral 1615 is a multiplier which multiplies the differential coefficient value for the horizontal direction dRY obtained from the triangle setup unit 1002 shown in FIG. 10 and the differential coefficient value for the vertical direction Y obtained from the subtractor 1613, and transfers the multiplication result to the adder 1620.

Numeral 1616 is a multiplier which multiplies the differential coefficient value for the horizontal direction dGX obtained from the triangle setup unit 1002 shown in FIG. 10 and the differential coefficient value for the vertical direction X obtained from the subtractor 1612, and transfers the multiplication result to the adder 1621.

Numeral 1617 is a multiplier which multiplies the differential coefficient value for the horizontal direction dGY obtained from the triangle setup unit 1002 shown in FIG. 10 and the differential coefficient value for the vertical direction Y obtained from the subtractor 1613, and transfers the multiplication result to the adder 1621.

Numeral 1618 is a multiplier which multiplies the differential coefficient value for the horizontal direction dBX obtained from the triangle setup unit 1002 shown in FIG. 10 and the differential coefficient value for the vertical direction X obtained from the subtractor 1612, and transfers the multiplication result to the adder 1622.

Numeral 1619 is a multiplier which multiplies the differential coefficient value for the horizontal direction dBY obtained from the triangle setup unit 1002 shown in FIG. 10 and the differential coefficient value for the vertical direction Y obtained from the subtractor 1613, and transfers the multiplication result to the adder 1622.

The adder 1620 adds the multiplication results in 1614 and 1615

The adder 1621 adds the multiplication results in 1616 and 1617.

The adder 1622 adds the multiplication results in 1618 and 1619.

Numeral 1623 is a register which stores the value of the processed results for a vertical direction according to XDDA.

Numeral 1624 is a register which stores the value of the processed results for a vertical direction according to YDDA.

Numeral 1625 is a register which updates the resultant R value from interpolating RGB of the left side for the vertical direction when the Y direction update signal from the RGB interpolating unit 1004 shown in FIG. 10 is in an "ON" state.

Numeral 1626 is a register which updates the resultant G value from interpolating RGB of the left side for the vertical direction when the Y direction update signal from the RGB interpolating unit 1004 shown in FIG. 10 is in an "ON" state.

Numeral 1627 is a register which updates the resultant B value from interpolating RGB of the left side for the vertical direction when the Y direction update signal from the RGB interpolating unit 1004 shown in FIG. 10 is in an "ON" state.

[Horizontal XDDA Unit]

Figure 17:
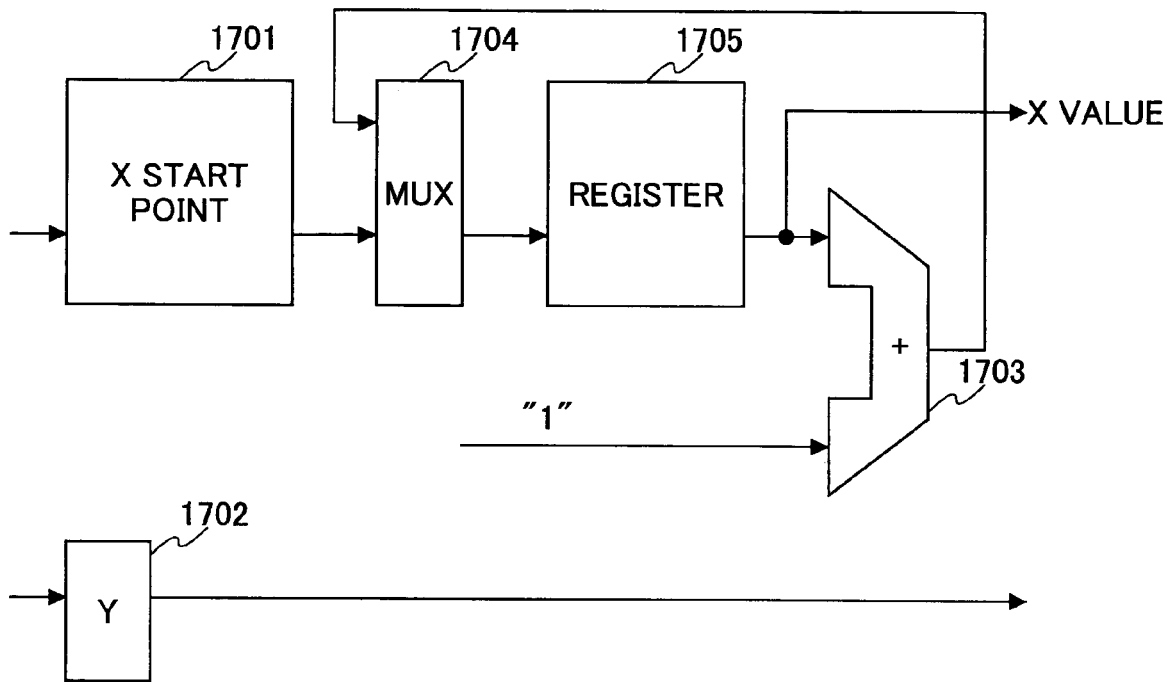
FIG. 17 is a block diagram showing a structure of a horizontal XDDA unit 1005 shown in FIG. 10.

FIG. 17 is a block diagram showing a horizontal XDDA unit 1005 shown in FIG. 10.

Numeral 1701 is a register which stores start point value X for a horizontal direction generated from the generation unit 1003 shown in FIG. 10.

Numeral 1702 is a register which stores start point value Y for a horizontal direction generated from the generation unit 1003 shown in FIG. 10.

Numeral 1703 is an adder which conducts addition for performing a DDA process for X.

Numeral 1704 is an MUX which transfers the start point value X stored in the register 1701 to a register 1705 as an initial value in the DDA process for X, and then, during the DDA process, transfers the output of the adder 1703 to the register 1705.

The register 1705 stores process results of the DDA process for X.

[Memory Address Generation Unit]

Figure 18:
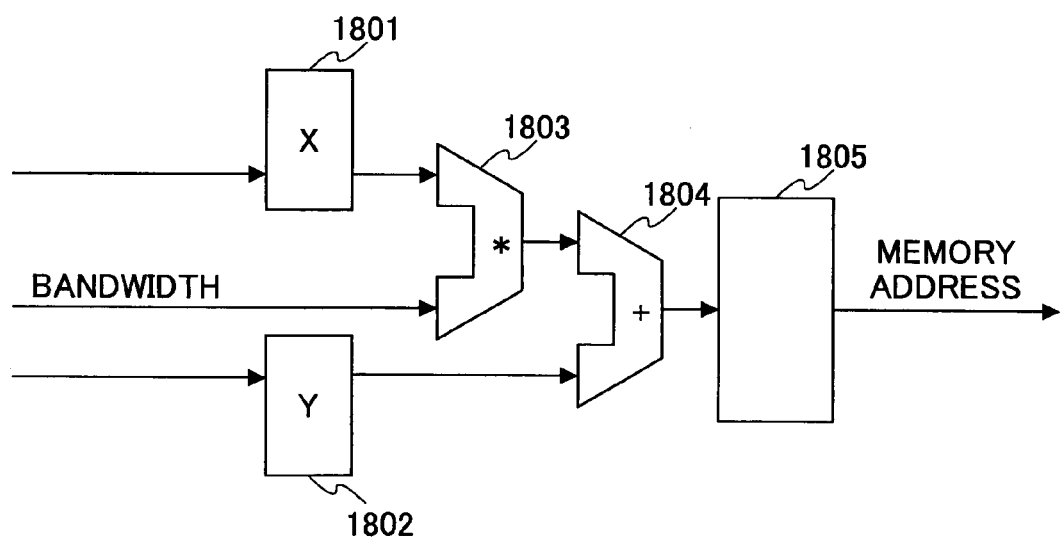
FIG. 18 is a block diagram showing a structure of a memory address generation unit 1008 shown in FIG. 10.

FIG. 18 is a block diagram of the memory address generation unit 1008 shown in FIG. 10.

Numeral 1801 is a register which stores X value output from the horizontal X DDA unit 1005 shown in FIG. 10.

Numeral 1802 is a register which stores Y value output from the horizontal X DDA unit 1005 shown in FIG. 10.

Numeral 1803 is a multiplier which multiplies the X value of the register 1801 and bandwidth.

Numeral 1804 is an adder which adds the output from the multiplier 1803 to the Y value of the register 1802, thereby obtaining a memory address (physical address).

Numeral 1805 is a register which stores the obtained memory address (physical address).

[RGB Interpolating Unit]

Figure 19:
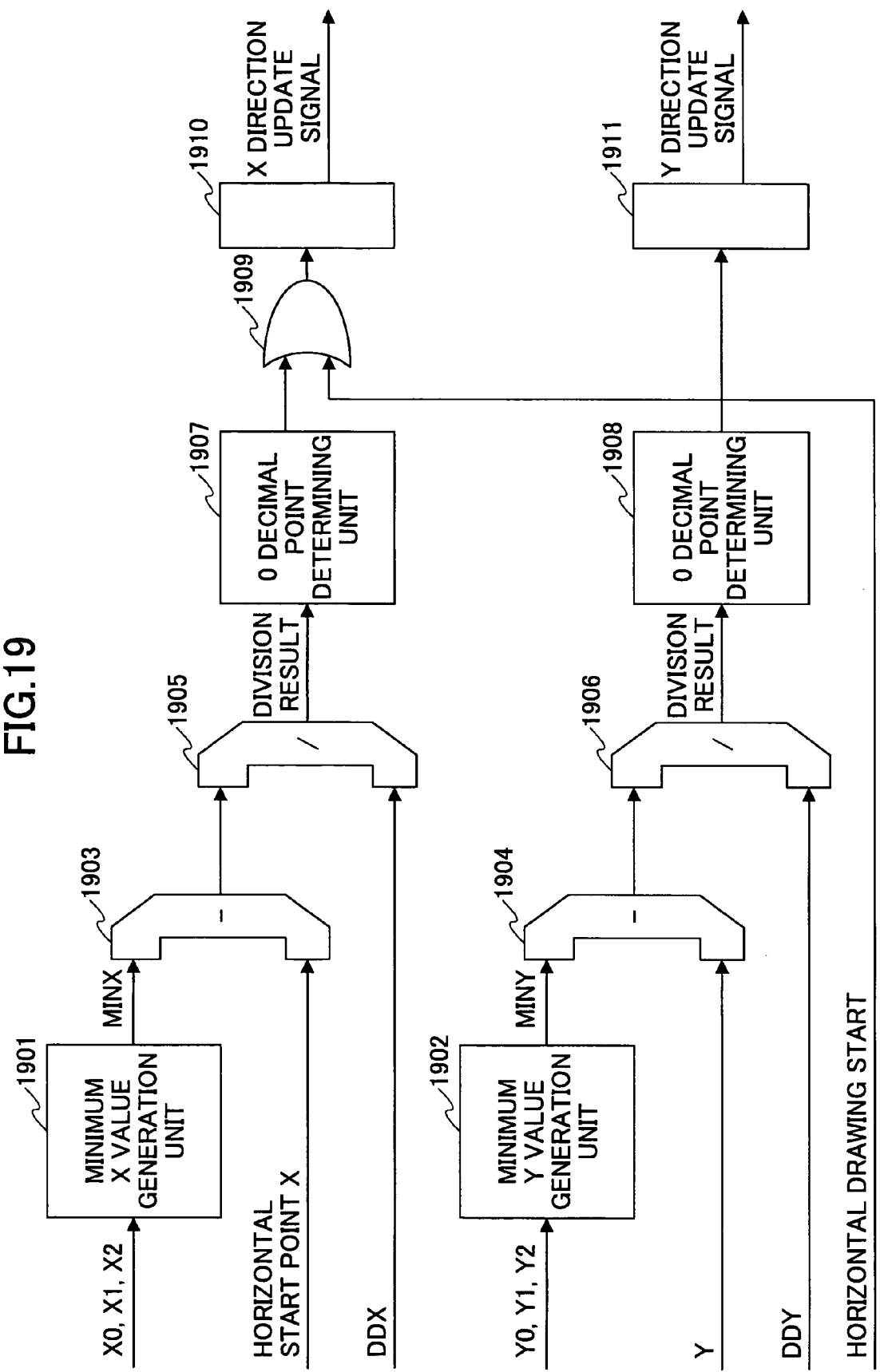
FIG. 19 is a block diagram showing a structure of an RGB interpolating unit 1004 shown in FIG. 10.

FIG. 19 is a block diagram of the RGB interpolating unit 1004 shown in FIG. 10.

Numeral 1901 is a minimum X value generation unit which receives X coordinates of each of the endpoints of the triangle from the command analyzing unit 1001 shown in FIG. 10, obtains a minimum X value, and transfers the obtained minimum X value to the subtractor 1903.

Numeral 1902 is a minimum Y value generation unit which receives Y coordinates of each of the endpoints of the triangle from the command analyzing unit 1001 shown in FIG. 10, obtains a minimum Y value, and transfers the obtained minimum Y value to the subtractor 1904.

Figure 28:
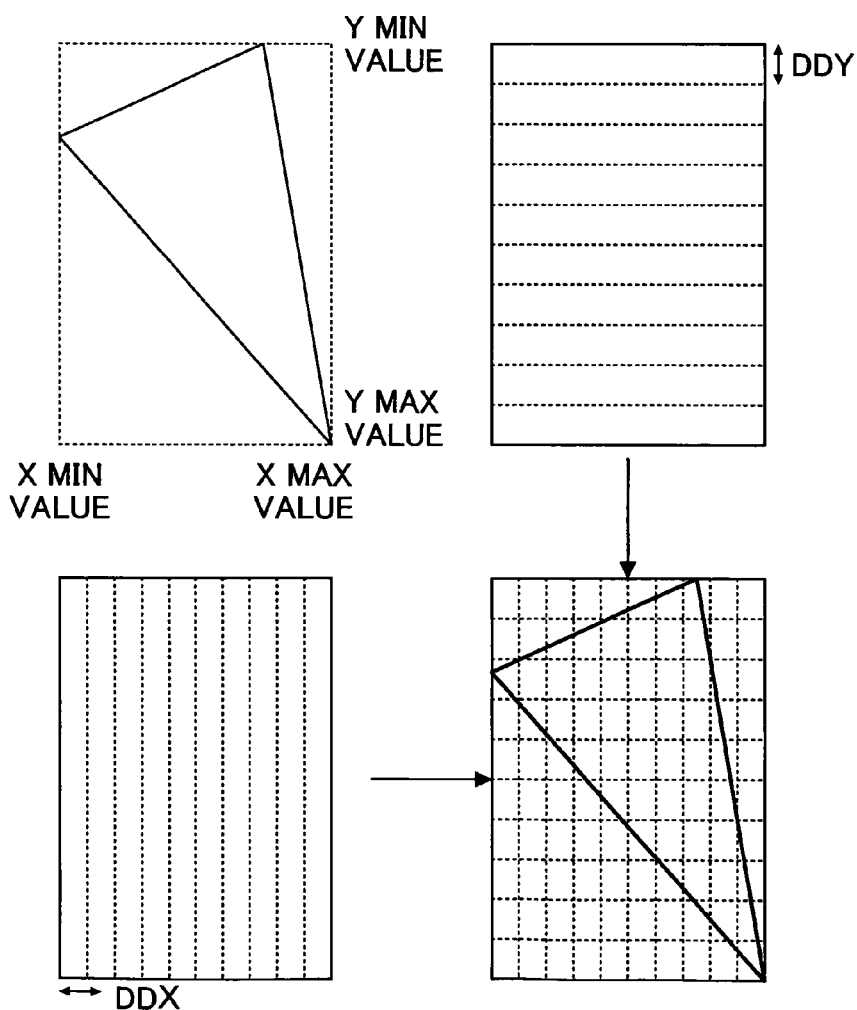
FIG. 28 is a diagram showing a relation between a triangle, minimum color length (DDX, DDY), and maximum and minimum values of X and Y.

The subtractor 1903 receives the horizontal-compensated X value from the horizontal X DDA unit 1005 shown in FIG. 10, and the minimum X value from the minimum X value generation unit 1901 so as to obtain the difference with respect to the minimum X value for a horizontal direction of the square surrounding the triangle (as shown in FIG. 28).

The subtractor 1904 receives the Y value from the horizontal X DDA unit 1005 shown in FIG. 10, and the minimum Y value from the minimum Y value generation unit 1902 so as to obtain the difference with respect to the minimum Y value for a vertical direction of the square surrounding the triangle (as shown in FIG. 28).

Numeral 1905 is a divider which receives the smallest unit of color in a horizontal direction DDX (see FIG. 28) from the parameter storage unit 803 shown in FIG. 8, divides the difference from the subtractor 1903 with DDX, and transfers the result of the division to a 0 decimal point determining unit 1907.

Numeral 1906 is a divider which receives the smallest unit of color in a vertical direction DDY (see FIG. 28) from the parameter storage unit 803 shown in FIG. 8, divides the difference from the subtractor 1904 with DDY, and transfers the result of the division to a 0 decimal point determining unit 1908.

The 0 decimal point determining unit 1907 receives the division result from the divider 1905, confirms that there is no remainder from the division, and determines whether the mesh shown in FIG. 28 is being crossed over in a horizontal direction.

The 0 decimal point determining unit 1908 receives the division result from the divider 1906, confirms that there is no remainder from the division, and determines whether the mesh shown in FIG. 28 is being crossed over in a vertical direction.

Numeral 1909 is an OR circuit which receives a horizontal drawing signal from the controller 1010 shown in FIG. 10 and unconditionally generates an X direction update signal when the horizontal drawing signal signifies "START".

Numeral 1910 is a register storing the X direction update signal from the OR circuit 1909.

Numeral 1911 is a register storing the Y direction update signal from the 0 decimal point determining unit 1908.

[Image Processing Unit]

Figure 20:
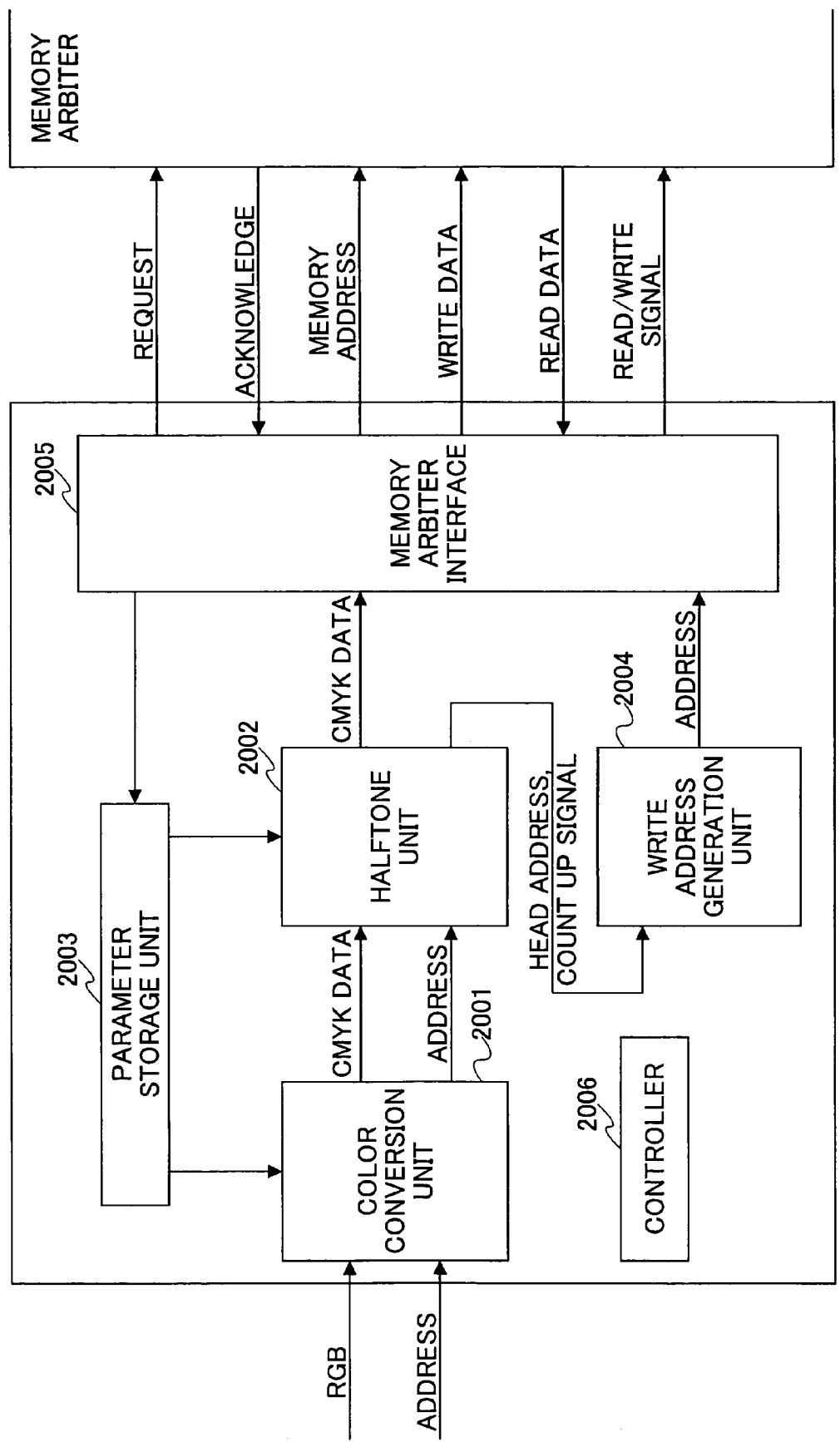
FIG. 20 is a block diagram showing a structure of an image processing unit 206 shown in FIG. 2.

FIG. 20 is a block diagram of the image processing unit 206 shown in FIG. 2.

Numeral 2001 is a color conversion unit which receives color information for each pixel and band address from the drawing unit 205 shown in FIG. 2, generates CMYK data by performing color conversion, and transfers the generated CMYK data and the band address to a halftone unit 2002.

The halftone unit 2002 receives the CMYK data and the band address from the color conversion unit 2001, performs a halftone process thereto, and transfers the result of the halftone process to a memory arbiter interface 2005.

Numeral 2003 is a parameter storage unit which temporarily stores parameters of the color conversion unit 2001 and the halftone unit 2002.

Numeral 2004 is a write address generation unit which generates addresses of the CMYK binary band memory spaces (shown in FIG. 5) in the main memory 224 (shown in FIG. 2).

The memory arbiter 2005 serves as an interface with respect to the memory arbiter 203 (shown in FIG. 2), and writes halftoned data to the main memory 224 (shown in FIG. 2) in accordance with the addresses from the write address generation unit 2004.

Numeral 2006 is a controller which entirely controls the image processing unit 206.

[Process Flow of Image Processing Unit]

Figure 21:
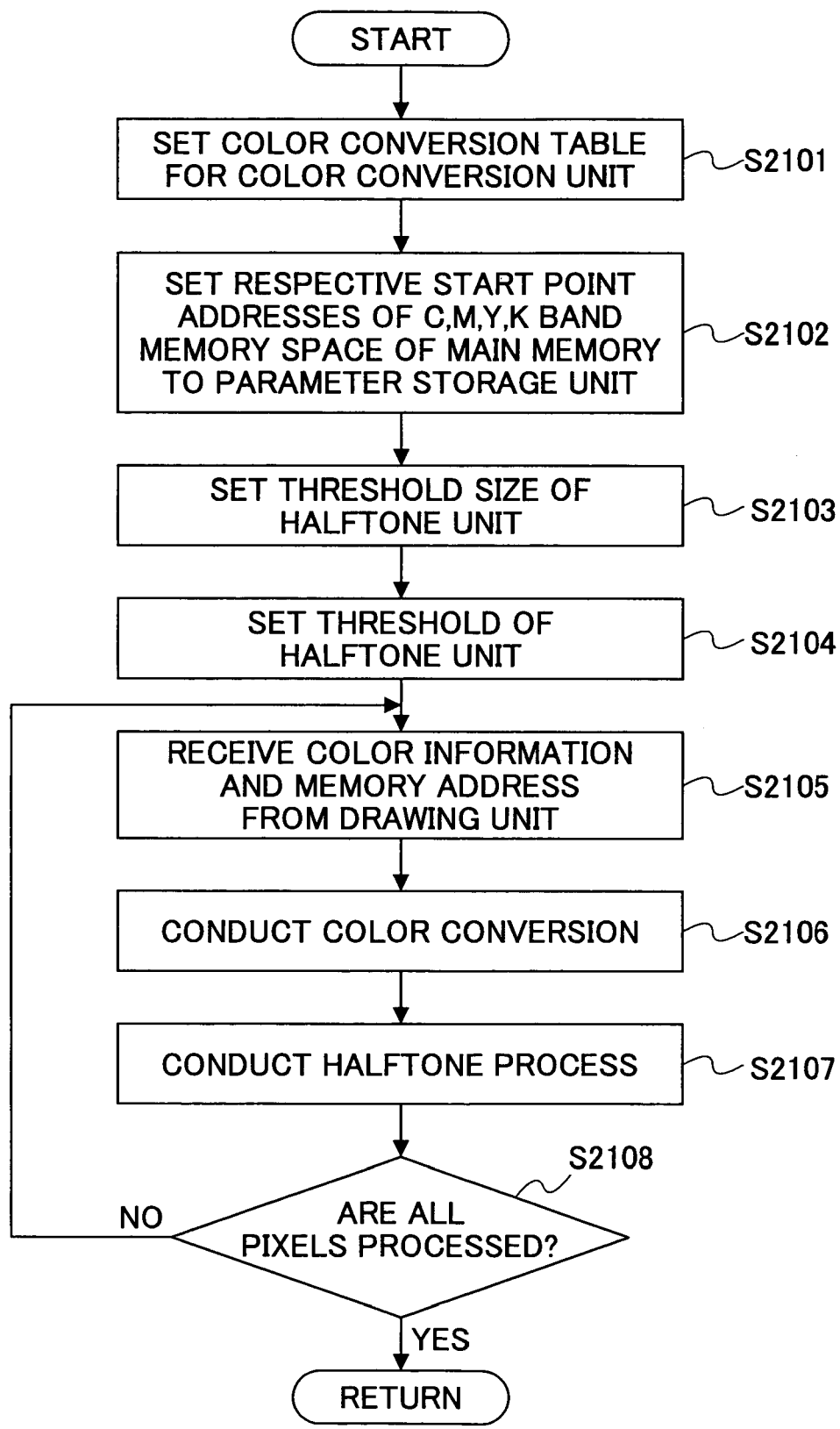
FIG. 21 is a flowchart showing a process performed by an image processing unit according to an embodiment of the present invention.

FIG. 21 shows a process flow of an image processing unit according to an embodiment of the present invention.

Step S2101: Set color conversion table for color conversion unit.

Step S2102: Set respective start point addresses of CMYK band memory space of the main memory to the parameter storage unit.

Step S2103: Set threshold size of halftone unit.

Step S2104: Set threshold of halftone unit.

Step S2105: Receive color information and memory address from the drawing unit.

Step S2106: Conduct color conversion.

Step S2107: Conduct halftone process (halftoning).

Step S2108: Withdraw from loop after all pixels are processed.

[Color Conversion Unit]

Figure 22:
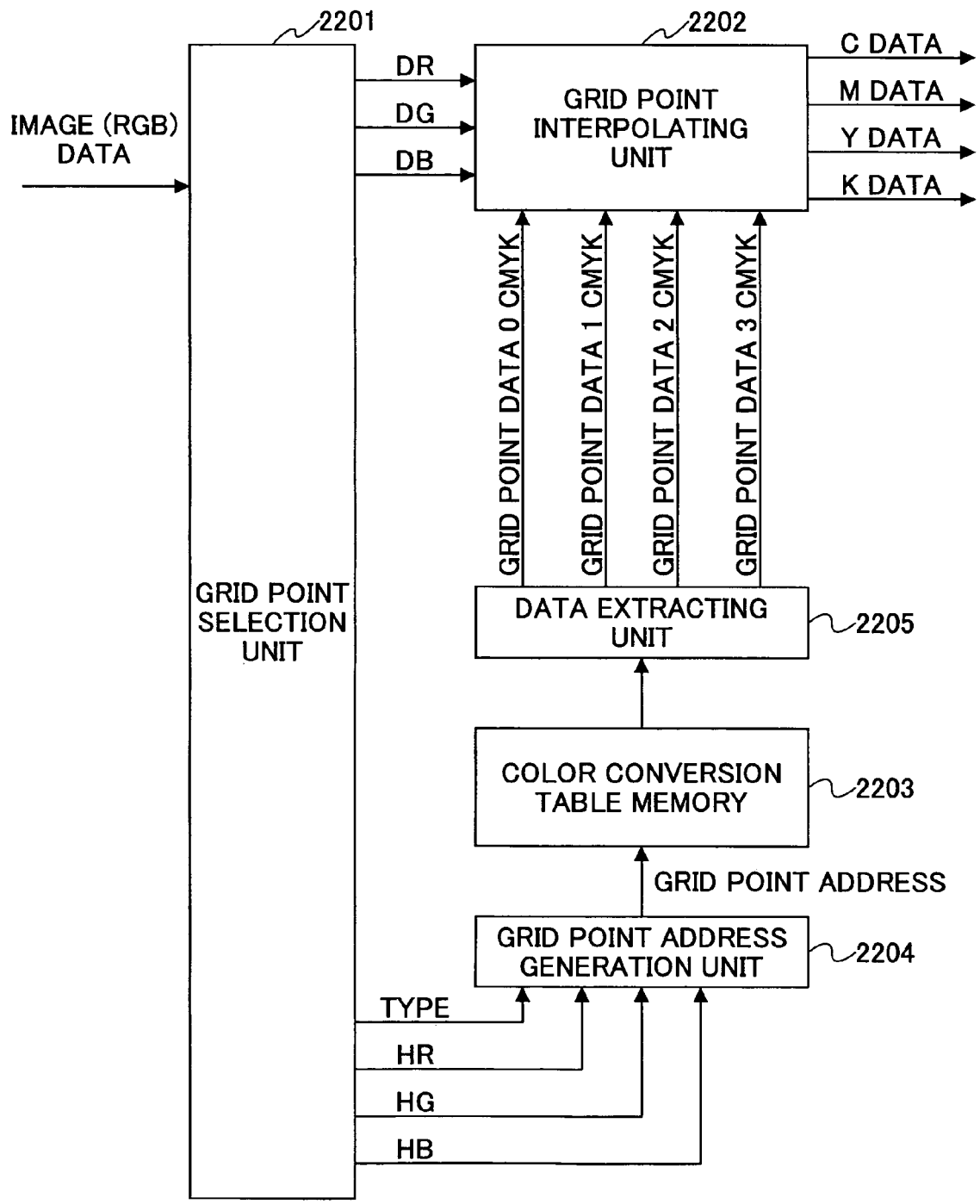
FIG. 22 is a block diagram showing a structure of a color conversion processing unit 2001 shown in FIG. 20.

FIG. 22 is a block diagram of the color conversion unit 2001 shown in FIG. 20.

Numeral 2201 is a grid point selection unit which receives image data (RGB) from the drawing unit 205 shown in FIG. 2, divides the respective R, G, B components into N BIT upper image data and 8-N BIT lower image data, changes the N BIT upper image data into HR, HG, HB and the 8-N BIT lower image data into DR, DG, DB, obtains TYPE by determining which of the six tetrahedrons of a cube (formed of 8 grid points) should HR, HG, HB, DR, DG, DB belong to, and transfers HR, HG, HB, TYPE to a grid point address generation unit 2204 and DR, DG, DB to a grid point interpolating unit 2202.

The grid point interpolating unit 2202 obtains C, M, Y, K data by interpolating in accordance with four interpolated CMYK grid points of a tetrahedron from a data extracting unit 2205 and DR, DG, DB of the grid point selection unit 2201.

Figure 24:
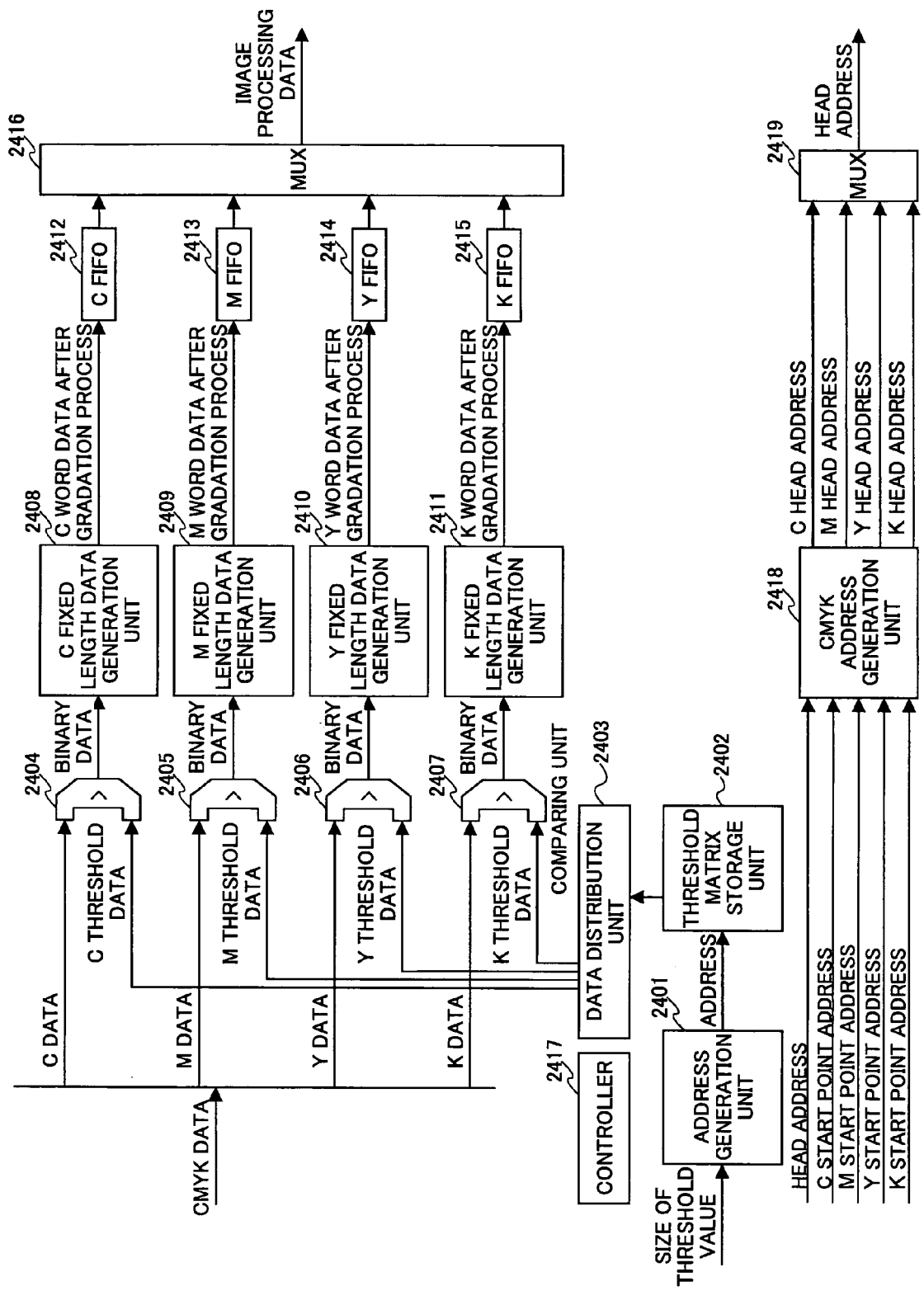
FIG. 24 is block diagram showing a structure of a halftone unit 2002 shown in FIG. 20.

Numeral 2203 is a color conversion table memory which stores grid point information in a format shown in FIG. 24, receives grid point address from the grid point address generation unit 2204, and transfers the grid point information to the data extracting unit 2205.

The grid point address generation unit 2204 obtains the grid point addresses of the color conversion table 2203 in accordance with HR, HG, HB, DR, DG, DB and TYPE from the grid point selection unit 2201.

The data extracting unit 2205 extracting four parameters from the grid point data of the color conversion table memory 2203 for interpolating with the grid point interpolating unit 2202.

[Process Flow of Color Conversion Unit]

Figure 23:
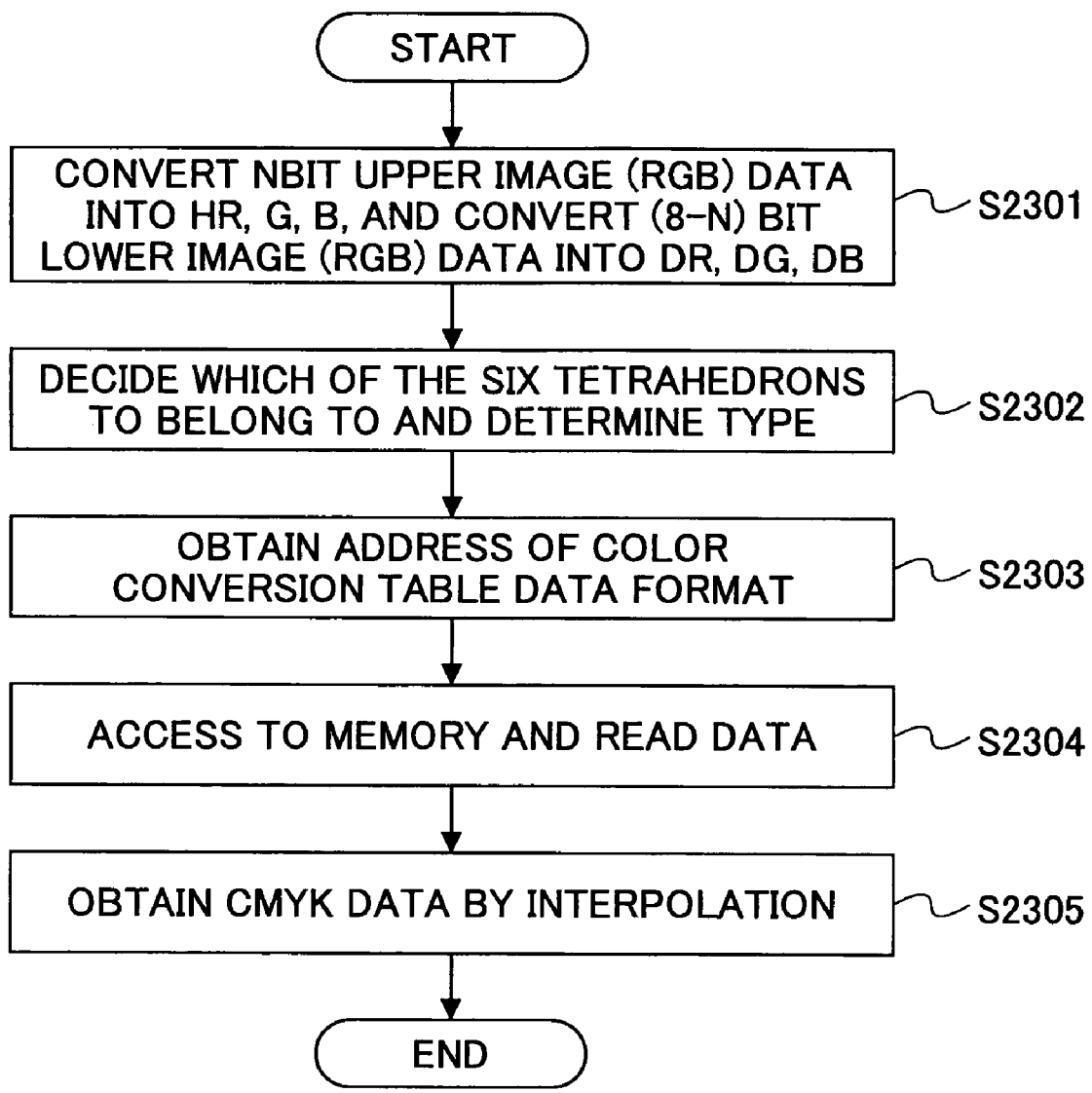
FIG. 23 is a flowchart showing a process performed by a color conversion processing unit according to an embodiment of the present invention.

FIG. 23 shows a process flow of the color conversion unit according to an embodiment of the present invention.

Step S2301: Convert N BIT upper image (RGB) data included the image (RGB) data input to the grid point selection unit 2201 (shown in FIG. 22) into HR, HG, HB, and convert (8-N) lower image (RGB) data included in the image (RGB) data input to the grid point selection unit 2201 (shown in FIG. 22) into DR, DG, DB.

Step S2302: Obtain TYPE from HR, HG, HB obtained from the grid point selection unit 2201 (shown in FIG. 22).

Step S2303: Obtain grid point address from the grid point address generation unit 2204 (shown in FIG. 22).

Step S2304: Read grid point data from the color conversion table memory 2203 (shown in FIG. 23).

Step S2305: Obtain C, M, Y, K data by interpolating grid point data with the grid point interpolating unit 2202 (shown in FIG. 22).

[Halftone Unit]

FIG. 24 is a block diagram of the halftone unit 2002 shown in FIG. 20.

Numeral 2401 is an address generation unit which receives a threshold size and generates an address of a threshold matrix storage unit 2402.

The threshold matrix storage unit 2402 stores respective threshold matrixes.

Numeral 2403 is a data distribution unit which receives threshold values of C, M, Y, K from the threshold matrix storage unit 2402, and distributes the respective threshold values to comparing units 2404 through 2407.

The comparing unit 2404 receives and compares C threshold data from the data distribution unit 2403 and the C pixel data from the color conversion unit 2001 (shown in FIG. 20), to thereby generate C halftoned data.

The comparing unit 2405 receives and compares M threshold data from the data distribution unit 2403 and the M pixel data from the color conversion unit 2001 (shown in FIG. 20), to thereby generate M halftoned data.

The comparing unit 2406 receives and compares Y threshold data from the data distribution unit 2403 and the Y pixel data from the color conversion unit 2001 (shown in FIG. 20), to thereby generate Y halftoned data.

The comparing unit 2407 receives and compares K threshold data from the data distribution unit 2403 and the K pixel data from the color conversion unit 2001 (shown in FIG. 20), to thereby generate K halftoned data.

Numeral 2408 is a C fixed length data generation unit which successively receives C halftoned data from the comparing unit 2404 and converts the halftoned data to fixed length data.

Numeral 2409 is an M fixed length data generation unit which successively receives M halftoned data from the comparing unit 2405 and converts the halftoned data to fixed length data.

Numeral 2410 is a Y fixed length data generation unit which successively receives Y halftoned data from the comparing unit 2406 and converts the halftoned data to fixed length data.

Numeral 2411 is a K fixed length data generation unit which successively receives K halftoned data from the comparing unit 2407 and converts the halftoned data to fixed length data.

Numeral 2412 is a C FIFO which receives and temporarily stores data from the C fixed length data generation unit 2408.

Numeral 2413 is an M FIFO which receives and temporarily stores data from the M fixed length data generation unit 2409.

Numeral 2414 is a Y FIFO which receives and temporarily stores data from the Y fixed length data generation unit 2410.

Numeral 2415 is a K FIFO which receives and temporarily stores data from the K fixed length data generation unit 2411.

Numeral 2416 is an MUX which receives data from respective FIFO, successively selects and transfers the data to the memory arbiter interface 2005 (shown in FIG. 20).

Numeral 2418 is a CMYK address generation unit which adds the respective C, M, Y, K start point addresses to the physical addresses (head addresses) from the color conversion unit 2001 (shown in FIG. 20), to thereby obtain respective C, M, Y, K head addresses and transfer the obtained addresses to an MUX 2419.

The MUX 2419 selects head addresses of the halftoned image data, which are to be written to the main memory, from the respective C, M, Y, K head addresses, and transfers the selected addresses to the write address generation unit 2004 (shown in FIG. 20).

[Process Flow of Halftone Unit]

Figure 25:
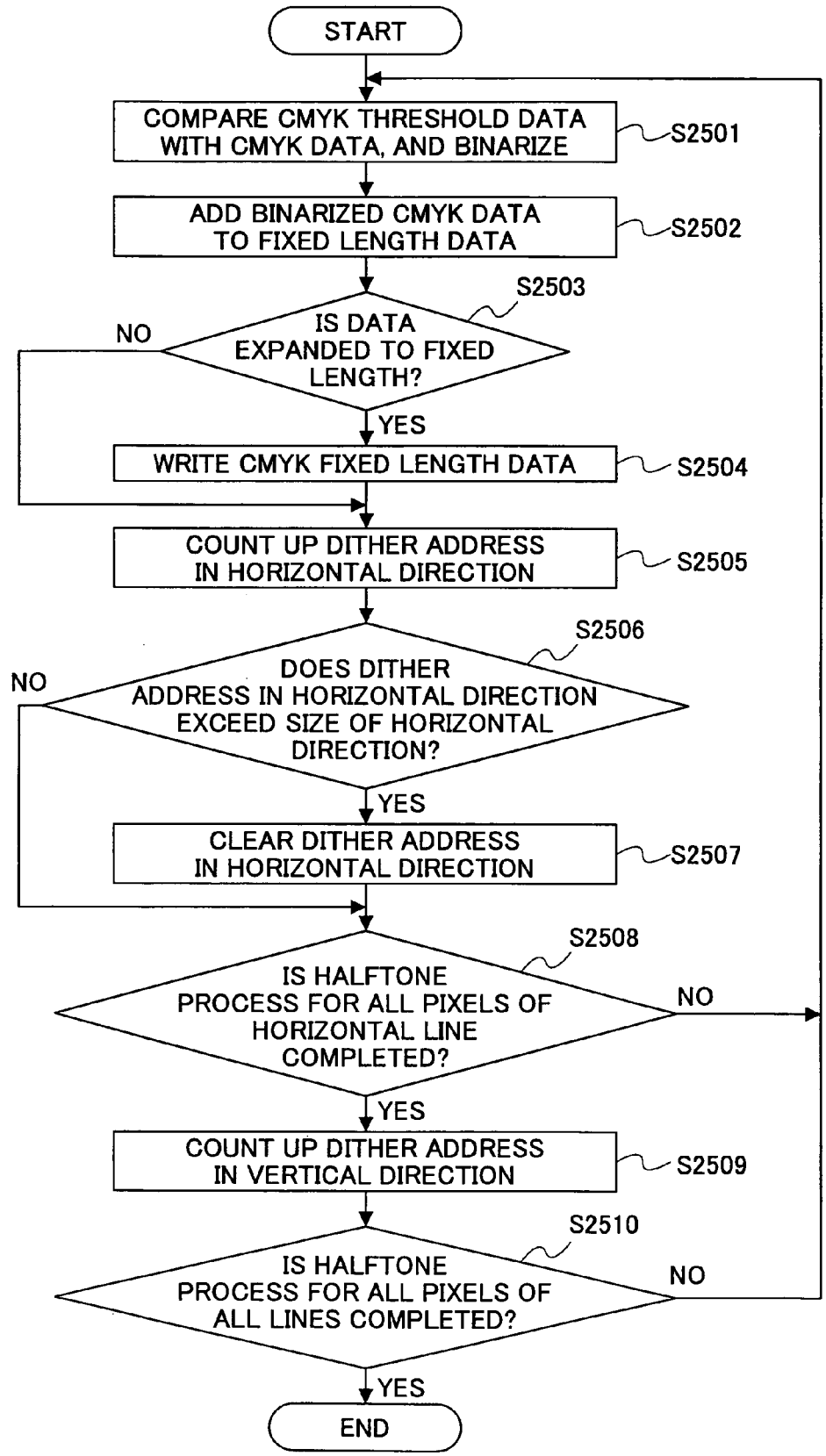
FIG. 25 is a flowchart showing a process performed by a halftone unit according to an embodiment of the present invention.

FIG. 25 shows a processing flow of the halftone unit according to an embodiment of the present invention.

Step S2501: Compare CMYK threshold data with CMYK pixel data and binarize.

Step S2502: Add binarized CMYK data to fixed length data.

Step S2503: Determine whether data is expanded to fixed length data.

Step S2504: Write CMYK fixed length data to FIFO.

Step S2505: Count up dither address in horizontal direction.

Step S2506: Determine whether dither address in the horizontal direction exceeds the size of the horizontal direction.

Step S2507: Clear dither address in the horizontal direction.

Step S2508: Determine whether halftoning (halftone process) for all pixels of horizontal line is completed.

Step S2509: Count up dither address in the vertical direction.

Step S2510: Determine whether halftoning (halftone process) for all pixels of all lines is completed.

Figure 26:
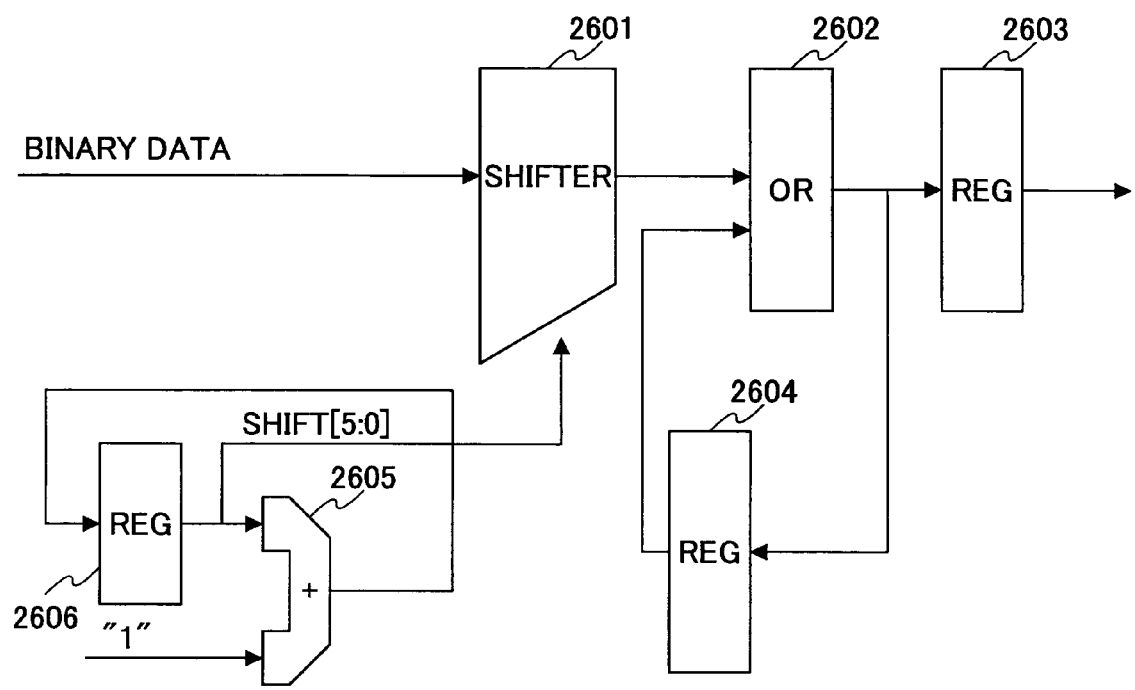
FIG. 26 is a block diagram showing a structure of a fixed length data generation unit 2408 shown in FIG. 24.

FIG. 26 is a block diagram of the fixed length data generation unit 2408 shown in FIG. 24.

Numeral 2601 is a shifter which receives binary data from the comparing unit 2404 (shown in FIG. 24) and shifts the binary data to an extent of a value obtained from a register 2606 (shown in FIG. 26), and transfers the shifted binary data to an OR unit 2602.

The OR unit 2602 performs OR processing to the shifted binary data from the shifter 2601, and transfers the OR processed data to a register 2604.

Numeral 2603 is a register which stores binary data that has been OR processed and added in the OR unit 2602.

The register 2604 stores data that has reached a fixed length.

Numeral 2605 is an adder which adds "1" whenever receiving binary data from the comparing unit 2404 (shown in FIG. 24).

The register 2606 stores shift value.

Although the aforementioned example describes a case where each endpoint of a gradient fill is interpolated with RGB color, the present invention may also be applied to a case of CMY, CMYK or Lab.

Furthermore, the present invention may be applied to a case of black and white where a single vector of gradation may be employed instead of three vectors as in the case of RGB.

Further, the present invention is not limited to these embodiments, but various variations and modifications may be made without departing from the scope of the present invention.

The present application is based on Japanese Priority Application No. 2003-017901 filed on Jan. 27, 2003, with the Japanese Patent Office, the entire contents of which are hereby incorporated by reference.

What is claimed is:

1. An image processing apparatus comprising:
   a command analyzing unit obtaining color information of each endpoint of an object by analyzing a drawing command;
   a draw processing unit obtaining the color information of successive scanned points inside the object through incremental interpolation of the color information, thereby successively producing the color information for an entirety of the object; and
   an image processing unit processing the color information outputted by the draw processing unit,
   wherein the draw processing unit further includes a color information interpolating unit controlling change of color by interpolating color in horizontal and vertical directions in accordance with a mesh, which is shaped as a square surrounding the object and is divided into minimal color lengths in vertical and horizontal directions.

2. The image processing apparatus as claimed in claim 1, wherein the draw processing unit includes:
   a setup unit obtaining differential coefficients of the color information in horizontal and vertical directions of the object, with a plane equation of the object with respect to the color information of each endpoint of the object;
   a start point computing unit obtaining X-Y coordinates and the color information of a start point situated on a left or right side of the object and on a given horizontal line by referring to said each end point and the differential coefficients; and
   a horizontal color information interpolating unit interpolating color information along the given horizontal line in accordance with the X-Y coordinates and the color information of the start point and the differential coefficients in the horizontal direction.

3. The image processing apparatus as claimed in claim 2, wherein the setup unit computes respective color information corresponding to said each endpoint in parallel.

4. The image processing apparatus as claimed in claim 2, wherein the start point computing unit includes:
   a vertical X value interpolating unit interpolating an X value in the vertical direction by referring to said each end point; and
   a vertical color information interpolating unit interpolating color information in the vertical direction by referring to said each end point.

5. The image processing apparatus as claimed in claim 2, wherein the horizontal color information interpolating unit interpolates respective color information corresponding to the color information obtained by the start point computing unit, in parallel.

6. The image processing apparatus as claimed in claim 1, wherein the image processing unit includes a color conversion unit converting color information obtained from the draw processing unit.

7. The image processing apparatus as claimed in claim 6, wherein the image processing unit includes a halftone unit halftoning the color information converted in the color conversion unit.

8. The image processing apparatus as claimed in claim 7, wherein the halftone unit includes a fixed length data generation unit converting the halftoned color information into word length for a band data storage unit.

9. An image processing method comprising the steps of:
   a) obtaining color information of each endpoint of an object by analyzing a drawing command;
   b) obtaining the color information of successive scanned points inside the object through incremental interpolation of the color information, thereby successively producing the color information for an entirety of the object; and
   c) processing the color information outputted in step b), wherein step b) further includes a step of:
   controlling change of color by interpolating color in horizontal and vertical directions in accordance with a mesh, which is shaped as a square surrounding the object and is divided into minimal color lengths in vertical and horizontal directions.

10. The image processing method as claimed in claim 9, wherein step b) includes the steps of:
    d) obtaining differential coefficients of the color information in horizontal and vertical directions of the object, with a plane equation of the object with respect to the color information of each endpoint of the object;
    e) obtaining X-Y coordinates and the color information of a start point situated on a left or right side of the object and on a given horizontal line by referring to said each end point and the differential coefficients; and
    f) interpolating color information along the given horizontal line in accordance with the X-Y coordinates and the color information of the start point and the differential coefficients in the horizontal direction.

11. The image processing method as claimed in claim 10, wherein respective color information corresponding to said each endpoint is computed in parallel in step d).

12. The image processing method as claimed in claim 10, wherein step e) includes the steps of:
    g) interpolating an X value in the vertical direction by referring to said each end point; and
    h) interpolating color information in the vertical direction by referring to said each end point.

13. The image processing method as claimed in claim 10, wherein respective color information corresponding to the color information obtained in step e), is interpolated in parallel.

14. The image processing method as claimed in claim 9, wherein step c) includes a step of:
    j) converting color information obtained in step b).

15. The image processing method as claimed in claim 14, wherein step c) includes a step of:
    k) halftoning the color information converted in step j).

16. The image processing method as claimed in claim 15, wherein step k) includes a step of:
    l) converting the halftoned color information into word length for a step of storing band data.

17. An image processing program comprising the functions of:
    a) obtaining color information of each endpoint of an object by analyzing a drawing command;
    b) obtaining the color information of successive scanned points inside the object through incremental interpolation of the color information, thereby successively producing the color information for an entirety of the object; and c) processing the color information outputted in function b), wherein function b) further includes a function of: controlling change of color by interpolating color in horizontal and vertical directions in accordance with a mesh, which is shaped as a square surrounding the object and is divided into minimal color lengths in vertical and horizontal directions.

18. The image processing program as claimed in claim 17, wherein function b) includes the functions of:

d) obtaining differential coefficients of the color information in horizontal and vertical directions of the object, with a plane equation of the object with respect to the color information of each endpoint of the object;

e) obtaining X-Y coordinates and the color information of a start point situated on a left or right side of the object and on a given horizontal line by referring to said each end point and the differential coefficients; and f) interpolating color information along the given horizontal line in accordance with the X-Y coordinates and the color information of the start point and the differential coefficients in the horizontal direction.

19. The image processing program as claimed in claim 18, wherein respective color information corresponding to said each endpoint is computed in parallel in function d).

20. The image processing program as claimed in claim 18, wherein function e) includes the functions of:

g) interpolating an X value in the vertical direction by referring to said each end point; and h) interpolating color information in the vertical direction by referring to said each end point.

21. The image processing program as claimed in claim 18, wherein respective color information corresponding to the color information obtained in function e), is interpolated in parallel.

22. The image processing program as claimed in claim 17, wherein function c) includes a function of:

j) converting color information obtained in function b).

23. The image processing program as claimed in claim 22, wherein function c) includes a function of:

k) halftoning the color information converted in function j).

24. The image processing program as claimed in claim 23, wherein function k) includes a function of:

l) converting the halftoned color information into word length for a function of storing band data.

* * * * *